(12) United States Patent
O'Brien et al.

(10) Patent No.: US 6,311,327 B1
(45) Date of Patent: Oct. 30, 2001

(54) METHOD AND APPARATUS FOR ANALYZING SOFTWARE IN A LANGUAGE-INDEPENDENT MANNER

(75) Inventors: Stephen Caine O'Brien, Tigard, OR (US); Sidney R. Maxwell, III, Bothell, WA (US)

(73) Assignee: Applied Microsystems Corp., Redmond, WA (US)

( * ) Notice: Subject to any disclaimer, the term of this patent is extended or adjusted under 35 U.S.C. 154(b) by 0 days.

(21) Appl. No.: 09/250,126

(22) Filed: Feb. 12, 1999

Related U.S. Application Data

(63) Continuation-in-part of application No. 09/035,308, filed on Mar. 2, 1998, now Pat. No. 6,161,200.

(51) Int. Cl.$^7$ .................................................. G06F 9/44
(52) U.S. Cl. ............................ 717/4; 717/8; 714/35; 714/38; 714/45
(58) Field of Search ................. 717/4, 8; 714/35, 714/38, 39, 45; 712/227

(56) References Cited

U.S. PATENT DOCUMENTS

| | | | |
|---|---|---|---|
| 5,265,254 | * 11/1993 | Blasciak et al. | 717/4 |
| 5,408,650 | 4/1995 | Arsenault | 395/575 |
| 5,450,586 | * 9/1995 | Kuzara et al. | 717/4 |
| 5,581,695 | * 12/1996 | Knoke et al. | 714/28 |
| 5,615,332 | * 3/1997 | Yamamoto | 714/38 |
| 5,737,520 | * 4/1998 | Gronlund et al. | 714/39 |
| 5,748,878 | * 5/1998 | Rees et al. | 714/38 |
| 5,771,345 | * 6/1998 | Tallman et al. | 714/30 |
| 5,903,759 | * 5/1999 | Sun et al. | 717/4 |
| 5,954,826 | * 9/1999 | Herman et al. | 714/46 |
| 6,016,557 | * 1/2000 | Kasprzyk et al. | 714/38 |
| 6,047,390 | * 4/2000 | Butt et al. | 714/43 |
| 6,094,730 | * 7/2000 | Lopez et al. | 714/28 |
| 6,106,571 | * 8/2000 | Maxwell | 717/4 |
| 6,161,200 | * 12/2000 | Rees et al. | 714/38 |

FOREIGN PATENT DOCUMENTS 0 567 722 A2   11/1993  (EP) ............................. G06F/11/00

OTHER PUBLICATIONS

Crooks, Roger "Embedded RISC μPs Present New Debugging Challenges," *EDN*, 39(16):105–112, Aug. 4, 1994.

* cited by examiner

*Primary Examiner*—Tuan Q. Dam
(74) *Attorney, Agent, or Firm*—Seed IP Law Group PLLC

(57) ABSTRACT

A software analysis system for capturing tags generated by tag statements in instrumented source code. The software analysis system includes a probe that monitors the address and data bus of the target system. When a tag statement is executed in the target system, a tag is written to a predetermined location in the address space of the target. The tag contains a tag value that is indicative of the location in the source code of the tag statement generating the tag. By monitoring the predetermined address, the probe is able to capture tags as they are written on the data bus of the target system. The source code instrumenter includes a language-dependent parser and a language-independent analyzer that records tagging data in a symbol database. The software analysis system may reference the tagging data in the symbol database while testing instrumented source code. The software analysis system performs a variety of analysis functions in essentially real time, including code coverage, function and task execution times, memory allocation, call pairs, and program tracing.

34 Claims, 19 Drawing Sheets

Performance: Call Linkage Table

File                                                                  Help
Find_   Filter_   Sort_                                Setup_

| Calling Function | Called Function | Number of Calls |
|---|---|---|
| ratio | outdot | 68927 |
| oneline_function | ratio | 50 |
| twoline_function | ratio | 33 |
| calltwo_function | oneline_function | 17 |
| callone_function | oneline_function | 17 |
| calltwo_function | twoline_function | 17 |
| callall | callone_function | 17 |
| callall | calltwo_function | 17 |
| callthree_functio | oneline_function | 16 |
| threeline_functio | ratio | 16 |
| callthree_functio | threeline_functio | 16 |

Fig. 13

| File | Line | Type | Source | Time |
|---|---|---|---|---|
| sortdemo.c | 00095 | Entry | WinMain | 0 |
| sortdemo.c | 00130 | Entry | InitApplication | 0 |
| sortdemo.c | 00146 | Exit | InitApplication | 0 nS |
| sortdemo.c | 00158 | Entry | InitInstance | 0 nS |
| sortdemo.c | 00180 | Branch | if (!hWnd) | 60 nS |
| sortdemo.c | 00186 | Exit | InitInstance | 60 nS |
| sortdemo.c | 00112 | Branch | while (GetMessage(1.meg, NULL, NULL, NULL)) { | 3.410 uS |
| sortdemo.c | 00260 | Branch | case IDW_EXCHANGE: | 3.410 uS |
| sortdemo.c | 00529 | Entry | InitSort | 3.410 uS |
| sortdemo.c | 00531 | Branch | if (NewRandom)   // if randomize just occurred | 3.410 uS |
| sortdemo.c | 00512 | Entry | InitPrevRandom | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |

METHOD AND APPARATUS FOR ANALYZING SOFTWARE IN A LANGUAGE-INDEPENDENT MANNER

CROSS-REFERENCE TO RELATED APPLICATION

This application is a continuation-in-part of U.S. patent application Ser. No. 09/035,308, filed Mar. 2, 1998, now U.S. Pat. No. 6,161,200.

TECHNICAL FIELD

This invention relates to software analysis, and more particularly to a method and apparatus for analyzing software having a language-independent software analysis component.

BACKGROUND OF THE INVENTION

Software is being written to control the operation of processors, including microprocessors, in a wide variety of fields. As software becomes more complex and lengthy, the probability of software errors or "bugs" increases. Furthermore, the difficulty of finding software bugs increases with this increased length and complexity of software. While bugs that prevent execution of the software will be apparent, other types of bugs merely effect the performance or efficiency of the software without preventing its execution. Software bugs that merely effect the execution of the software may easily go undetected, thus indefinitely impairing the efficiency of the software. For example, software may allocate memory resources in an inefficient manner, thus preventing the software from running at optimum speed. However, since the software continues to execute, the existence of these memory allocation errors will not be apparent.

A number of techniques have been developed to analyze the performance of software in an attempt to find software bugs, including software bugs that merely effect the performance of the software execution. One conventional technique is instrumented source code in which executable tag statements are inserted into various branches and locations of source code, thereby "instrumenting" the source code. After the source code has been compiled and linked, the tag statements are executed along with the code. As each tag statement is executed, it performs an operation that can be either detected by an analysis device or recorded for later examination. For example, each tag statement may write a value to a respective address so that the content of the variable provides an indication of which tag statements were executed. As another example, each tag statement may send tag identifying data to a disk file. As still another example, an array can be reserved in memory, with each array element corresponding to a tag inserted in a respective location in the source code. As each tag is executed, it sets a corresponding valuein the array. One approach to analyzing software with instrumented code is described in U.S. Pat. No. 5,265,254 to Blasciak et al.

Using instrumented code, a wide variety of software parameters can be analyzed. Not only can instrumented source code allow one to determine which branches have been executed, but it can also determine the execution time of a branch or function by placing executable tag statements at the entry and exit points of the branch or function. When these tag statements are executed, they generate respective tags which are time stamped so that the elapsed time between executing the tag statements can be determined.

Although conventional code instrumentation techniques are useful for analyzing the performance of software in a general purpose (i.e., "host") computer system, the conventional instrumentation techniques are less suitable for analyzing the execution of software in an embedded system. An embedded system is a system whose primary purpose is to perform a specific function rather than to perform general computational functions. For example, a microprocessor-based microwave oven controller, a microprocessor-based automobile ignition system, and a microprocessor-based telephone switching system are all embedded systems. Embedded systems do not lend themselves to instrumented code for several reasons. First, embedded systems generally do not have mass storage devices, such as disk storage, to store the result of tag statement executions. While the result of executing a tag statement can be stored in on-board random access memory, it is often difficult to externally retrieve such information. Furthermore, storing the results of tag statement executions in system memory consumes system memory resources thus preventing the target from executing the software in a normal manner. It is generally desirable to test the performance of software in an embedded system under the same conditions that the software will normally run. Thus, an ideal software analysis technique would be "transparent" to the target system and thus have no effect on the manner in which the target system executes software. For these reasons, conventional instrumentation techniques are generally not suitable for analyzing software in an embedded system.

In addition to software-based software analysis techniques (e.g., instrumented code), hardware-based techniques have been developed to analyze software executing in embedded systems. For example, logic probes have been placed on the address and data bus lines of microprocessors in an attempt to observe the execution of software in embedded systems. However, it is very difficult to monitor the execution of software using logic analyzers, and the lack of any data reduction on the output of the logic analyzer makes this technique very time-consuming. Furthermore, it is not always possible to determine which instructions are being executed using the logic analyzer. For example, processors executing instructions from internal cache memory cannot be monitored using a logic probe because the execution of these instructions is not reflected on externally accessible busses. In other words, systems with a large cache memory may process a great number of instructions and process large amounts of data without necessarily having to pass any of this information along externally accessible bus lines.

Another hardware-based technique for analyzing the performance of software in embedded systems uses an emulator in connection with instrumented code. Basically, this technique uses an emulator to monitor the execution of tag statements thus eliminating the need to consume system memory resources and providing a means to extract tag execution data. One example of this approach is described in U.S. Pat. No. 4,914,659 to Erickson. As described in the Erickson patent, tag statements are inserted in the source code and executed in an emulator connected to the target system. Each of the tag statements writes a variable to a respective unique address. The emulator monitors the address bus of the emulator processor to detect addresses on the address bus corresponding to the respective tag statements. While the approach described in the Erickson patent does extract the tag execution data without consuming system resources, it nevertheless suffers from a number of limitations. For example, by requiring that there be a unique address reserved for each tag statement, overlay memory techniques must be employed and a substantial amount of the target system's address is consumed.

Another hardware approach to analyzing software executing in an embedded system is described in U.S. Pat. No. 4,937,740 to Agarwal et al. The Agarwal et al. patent discloses a software analysis system in which a hardware probe monitors the address bus of the target system to capture addresses. The system disclosed in the Agarwal et al. patent includes an internal tag generator that generates tags when respective addresses (up to 256) selected by the user are captured by the probe. Since the Agarwal et al. system does not use instrumented code techniques or otherwise correlate tags generated from the captured addresses with respective software locations, the Agarwal et al. system does not provide easy to use and understand information about the execution of the software.

There is therefore a need for a method and apparatus that can analyze the execution of software in an embedded system without the requirement that the embedded system have on-board data storage and/or output port capabilities in a manner that does not consume system memory resources, including memory, processor time and I/O resources, of the target system.

SUMMARY OF THE INVENTION

The inventive method and apparatus analyzes software being executed in a target system having a data bus and an address bus. A code parser in a tag statement instrumenter inserts a plurality of executable tag statements in the source code prior to or during the compiling procedure. Each of the tag statements, when executed, causes the target system to write a tag to a predetermined location in the address space of the target system. The tags contain respective tag values so that, by the proper placement of tag statements in the source code, the tag values identify the respective locations in the source code of tag statements generating the tags. During execution of the instrumented code, the address bus of the target system is monitored to detect when the predetermined location in the address space of the target system is being addressed. The data bus of the target system is also monitored to capture a tag on the data bus when addressing of the predetermined location is detected. Based on the respective tag values of the captured tags, the inventive method and apparatus is able to determine the source code locations that are being executed.

Another aspect of the present invention arises from the separation of the tag statement instrumenter into a language-dependent parser and a language-independent instrumenter. The language-dependent parser performs tagging point detection and tagging statement insertion in a manner appropriate for the specific programming language of the source code being instrumented. The language-independent instrumenter includes a language-independent analyzer that provides tag values to the language-dependent parser and processes tagging data for storage in a symbol database. This aspect of the invention simplifies maintenance of the tag statement instrumenter and allows the same language-independent instrumenter to be used in the tag statement instrumenter for any programming language. The language-independent instrumenter may also be used with multiple language-dependent parsers to instrument computer programs written in more than one programming language. The language-dependent parser may utilize an existing compiler and parse source code during a combined compilation and instrumentation procedure. In another aspect of the invention, the language-dependent parser and language-independent analyzer divert the compilation process in an existing compiler in order to instrument the code being compiled.

The tags generated by respective tag statements may have a number of types, such as control tags and data tags. Control tags include a data field having a tag value corresponding to the location in the source code of the tag statement generating the tag, as explained above. Data tags are always associated with a specific control tag, and they have a data field that provides information about an event identified by the control tag with which it is associated. Control tags may also have a tag type field that identifies the analysis function for which the tag is used.

According to yet another aspect of the invention, the tag statement instrumenter and the language-independent instrumenter may be utilized in testing computer programs in non-embedded systems, such as UNIX workstations and target systems having large internal cache memories. In target systems having large cache memories, for example, the tag statement instrumenter inserts tag statements that perform a simple, non-cached memory write. The memory write may be to persistent memory, such as RAM, or to any port. Thus, any simple assignment statement may be used. The tags may also be detected by a function call to a location outside the internal cache memory, such as a function call to a network service. The function call thus delivers tagging information outside of the cache memory where it may be monitored and analyzed.

The inventive method and apparatus performs a wide variety of software analysis functions. Performance analysis can be accomplished by recording first and second times when respective first and second tags are present on the data bus. The first and second tags have respective tag values corresponding to the location in the instrumented code of first and second tag statements generating the first and second tags. Based on the difference between the first and second times, the time required to execute the software between the first and second locations is determined.

Memory allocation analysis can be accomplished by inserting control tag statements in the source code at a locations that will cause the tags to be executed along with memory allocation statements. An executable data tag statement is also inserted along with each control tag to write a data tag to a second predetermined location in the address space of the target system. The data value of the data tag indicates the memory being allocated by the memory allocation statement. The inventive method and apparatus detects when the second predetermined location in the address space of the target system is being addressed to capture data tags on the data bus. The memory allocation resulting from the memory allocation statements are then determined based on the data values of the captured data tag.

Function linking can be analyzed by inserting tag statements in the source code at locations causing respective tag statements to be executed along function call statements. Based on the order in which the tags are captured when addressing of the predetermined location is detected, the inventive method and apparatus determines which functions of the source code are linked to other functions of the source code.

The inventive method and apparatus performs code coverage analysis by inserting tag respective statements in basic blocks of the source code so that the tag statements will be executed along with the basic blocks. Based on the tag values of the tags captured when addressing of the predetermined location is detected, the inventive method and apparatus determines which basic blocks of the source code have been executed.

BRIEF DESCRIPTION OF THE DRAWINGS

FIG. 13 is a display screen showing the results of a call linkage analysis performed by the software analysis system of FIG. 1.

FIG. 17 is a screen display showing the results of a more detailed trace performed by the software analysis system of FIG. 1.

FIG. 18 is a screen display showing the results of another more detailed trace analysis performed by the software analysis system of FIG. 1.

DETAILED DESCRIPTION OF THE INVENTION

Conventional source code instrumentation systems have been constructed in a programming language specific manner, even though only an instrumenter's source code parsing functionality needs to be language specific. As a result, conventional instrumenters have been strictly tied to supporting a particular programming language and often a particular vendor's compiler for that programming language. Also, conventional tagging schemes have been underdeveloped because the bulk of the instrumentation effort has been devoted to language-specific processing, including the construction of language-specific instrumentation symbol tables. However, many aspects of the tagging scheme could be performed in a language-independent manner, such as construction of the instrumentation symbol table, and language-independent processing enables development of more sophisticated tagging schemes. The language-independent portion of the instrumenter could then be used for all supported languages, thus simplifying instrumenter maintenance and providing greater flexibility to the instrumenter. Accordingly, a single language-independent instrumenter may instrument computer programs written in languages such as Ada™, FORTRAN, COBOL, Pascal, C, and C++, for example.

Figure 1:
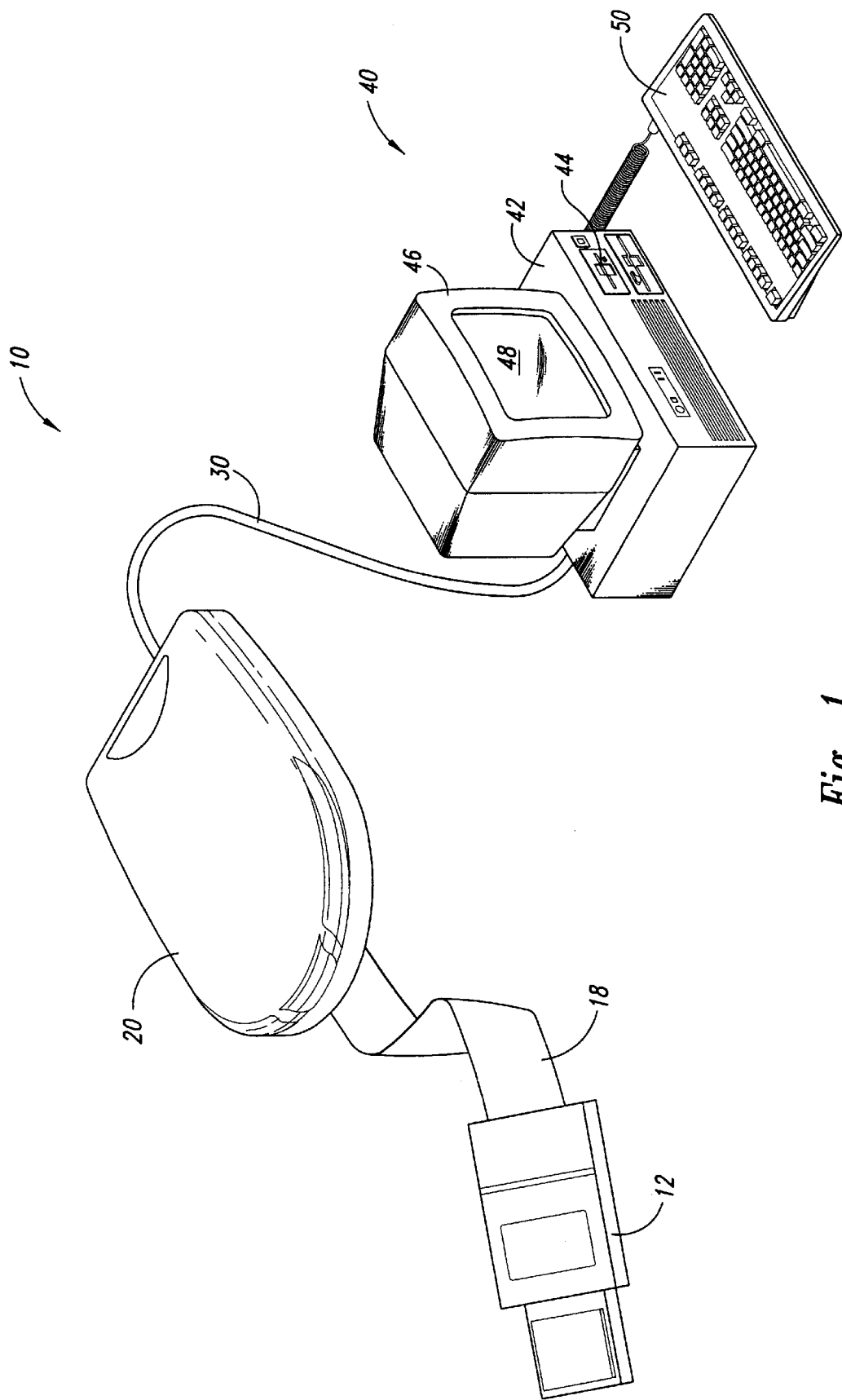
FIG. 1 is an isometric view of a preferred embodiment of the inventive software analysis system.

An embodiment of a software analysis system 10 in accordance with an aspect of the invention is illustrated in FIG. 1. The system 10 includes a probe tip 12 that clips onto the microprocessor of a target system (not shown) in a conventional manner. As a result, the external connector pins of the target system microprocessor, including its data bus and address bus, are accessible to the probe tip 12. The probe tip is connected through a conventional ribbon conductor 18 to a probe chassis 20 containing most of the electronics for the system 10. The probe chassis 20 is, in turn, connected through a suitable cable 30, such as an Ethernet cable, to a host system 40. The host system 40 is essentially a conventional PC computer having a processor chassis 42 with a disk drive 44, a CRT monitor 46 with a display screen 48, and a keyboard 50. The host system 40 preferably uses a UNIX® or Windows® user interface and operating system. Application specific software is loaded through the disk drive 44 to cause the host system 40 to properly interface with the probe chassis 20, receive appropriate configuration and operating commands through the keyboard 50, and display analysis results on the screen 48.

Figure 2:
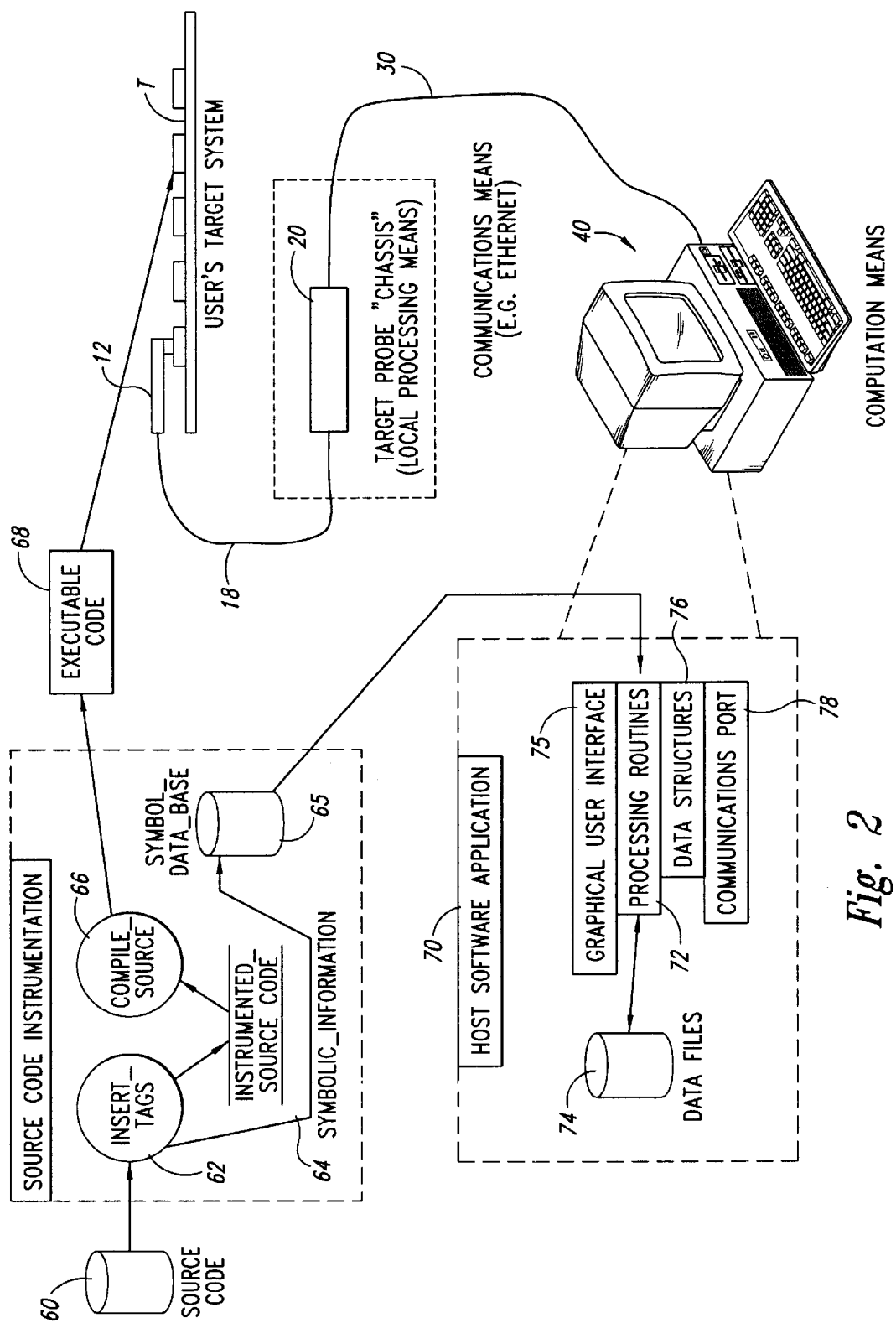
FIG. 2 is a schematic and block diagram of the software analysis system of FIG. 1 and its manner of use.

The use of the software analysis system 10 is illustrated in FIG. 2. A source code instrumentation system 61 includes a modified compiler 66 and a tag instrumenter 69. The source code instrumentation system 61 receives source code 60 and instruments the source code 60 by inserting executable tag statements 62 into the source code 60 at various locations of interest prior to or during the process of compiling the source code 60 in the modified compiler 66. The modified compiler 66 communicates with the tag instrumenter 69 having a language-independent analyzer 321 and a language-independent symbol database 65. If the user is interested in determining code coverage, the user may direct the modified compiler 66 to insert a tag statement 62 in each branch of the source code 60, and the system 10 will determine which of the branches have been executed based on whether each tag statement 62 has been executed. Other analysis functions are described in detail below.

An executable tag statement assigns a value to a tag variable, with the value having a precise meaning that identifies a particular action occurring in a computer program. The insertion of tag statements 62 in the source code 60, in conjunction with the compilation process, results in instrumented object code 67 that may be linked to form executable code 68. The language-independent analyzer 321 fills the instrumentation symbol table, the language-independent symbol database 65, with tagging data, correlating each of the tag statements 62 to their locations in the source code 60. Aside from the production of instrumented object code 67, the modified compiler 66 operates in a conventional manner. As will be discussed further below, the modified compiler 66 may be modified to incorporate a parser that serves as the modified compiler's parser and that also parses the source code 60 for the tag instrumenter 69, communicating tagging data with the language-independent analyzer 321. This embodiment of the invention normally requires the cooperation of the compiler vendor for the modified compiler 66. In another embodiment, the modified compiler 66 may be modified without the compiler vendor's assistance by interrupting the normal processing flow in the compiler to divert partially compiled files to a language dependent instrumentation parser that parses the source code 60 for instrumentation purposes and passes tagging data to the language-independent analyzer 321.

The executable code 68 is then loaded into the target system T by any suitable means. For example, the executable code may be stored in a programmable read-only memory ("PROM") that is installed in the target system T. The executable code 68 may also be executed in the target system T through a conventional emulator (not shown). Regardless of how the executable code 68 is loaded into the target T, the target T is then allowed to execute the code. The probe tip 12 clips on to the target system T in a conventional manner to make electrical contact with at least the address bus and the data bus of the target system T. Tags generated by the execution of tag statements 62 and collected by the probe tip are transferred to the probe chassis 20 through ribbon cable 18. After the probe chassis 20 has performed various tabulation and data reduction functions on the data from the probe tip 12, it outputs appropriate data to the host system 40 through the local area network cable 30. Host application software 70 includes processing routines 72 that store data in and retrieve data from data files 74, and the host application software 70 also includes a graphical user interface 75, such as the X-11 or Microsoft Windows® interface, that works with the processing routines 72 to operate on the data files 74 and provide various displays of analysis data. The processing routines 72 also receive the symbol database 65 so that the tag execution data in the data files 74 can be correlated with the location of the tag statements in the symbol database 65 in order to provide reports and displays that specify performance in terms of source code locations and branches. The symbol database 65 is preferably loaded into the host through the disk drive 44 (FIG. 1). The host application software 70 also includes data structure 76 for storing and handling the analysis data, and communications software 78 for providing communication with the target access probe 20.

In operation, each of the tag statements 62 generate a respective tag containing a data field having a "tag value" that is generally unique to the location of the tag statement in the source code 60. Thus, for example, a first branch may contain a tag statement having a tag value of 1. A second branch may contain a tag statement having a tag value of 2, and so forth. When the tag statement 62 is executed by the target T, a processor in the target T writes a tag containing the tag value to a predetermined location in the address space of the target system T. As explained in greater detail below, the tag 62 may also contain at least one other field providing information about its function or location of its associated tag statement 62 in the source code 60. More specifically, the tag statement 62 preferably writes a tag consisting of 32 bits which includes not only a data field word having a tag value, but also a number of bits which define the type or category of tag. For example, different tag types may identify function entry and exit points, branch points, and memory allocation statements. Tags having a tag type field to identify the tag type are known as "control tags." In the preferred embodiment of the system 10, all control tags are written to the same location in the address space of the target. In addition to control tags, the system 10 also utilizes data tags. Data tags accompany control tags and are written to a second location in the address space of the target to provide additional information relevant to a particular control tag. For example, a control tag may indicate that a memory allocation is taking place, and two data tags accompanying the control tag may indicate the size of the memory allocation and the memory pointer associated with that allocation, respectively. Since only a single location in the address space of the target system preferably is used for control tags and a relatively few locations used for data tags, the inventive system 10 does not significantly use the memory resources of the target system, thus making the analysis system substantially transparent to the target system.

Tags generated by the invention also provide coverage of branch points, or decision points, during execution of the computer program. A decision analysis tag allows the instrumentation system to determine which branch of a conditional statement has been executed by the computer. Decision analysis tags provide the additional analysis of a computer program's performance called for by the requirements for modified condition decision coverage ("MCDC") required for flight critical software, as recited in DO178B by the Federal Aviation Administration ("FAA"). DO178B requires that execution at each of a program's branch points be demonstrated for flight critical software, including the executable statements that follow the selection of a particular branch point.

The probe tip 12 monitors the address bus and the data bus of the target T and determines when the processor addresses the predetermined location(s) in the address space of the target system T. The probe tip 12 then captures the tag value currently on the data bus. As a result, the currently captured tag value indicates the location in the source code 60 currently being executed. Moreover, the system 10 monitors the execution of the software in the target T in essentially real time since the probe 20 receives each of the tag values as it is captured and performs various functions using the tag value. For example, for some software analysis functions, the probe 20 associates an execution time with the tag value so that the execution time between a pair of tag statements can be determined. The probe chassis 20 may also perform various data reduction operations on the tag value, such as, for example, call pair analysis (i.e., generating statistics on functions that are called by other functions) allocation. Basically, the system 10 is capable of determining function and task execution times, coverage analysis, i.e., identifying portions of the source code executed or not executed, memory allocation analysis (i. e., identifying how much memory each allocation statement in the source code allocates and identifying specific allocation errors), and program tracing (i.e., creating a sequential history of the execution of the source code). Once again, the probe chassis 20 performs these functions in essentially real time. Finally, the probe chassis 20 communicates with the host 40 to upload the data and allow it to be displayed by the host.

Figure 3:
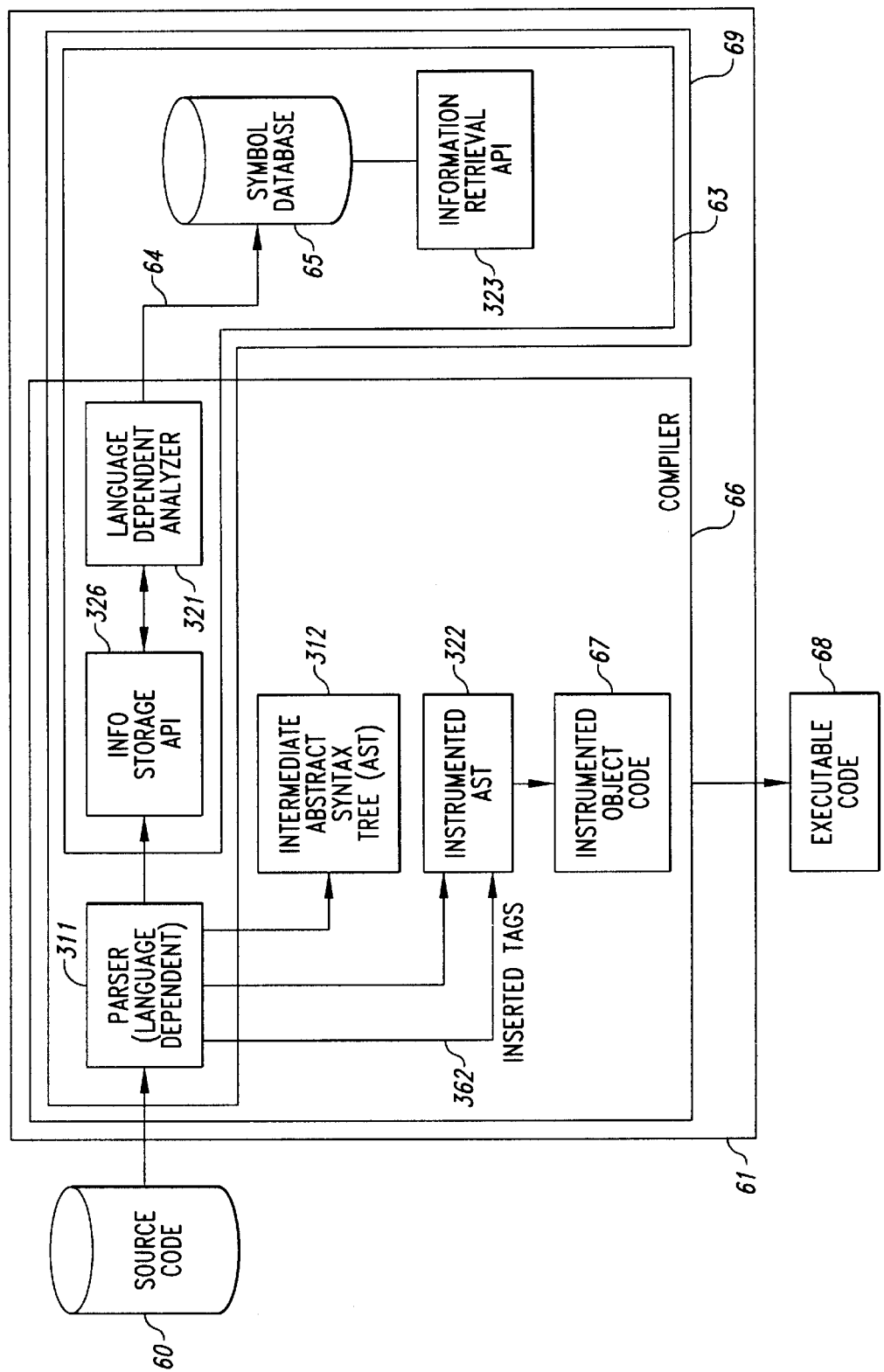
FIG. 3 is a schematic and block diagram providing more detail of the source code instrumentation system shown in FIG. 1.

FIG. 3 provides additional detail regarding an embodiment of the source code instrumentation system 61. The source code instrumentation system 61 implements a source code tagging scheme in which various tag types represent different programming constructs. Because these constructs may be found in many block structured languages, the instrumentation scheme may be utilized in any block structured language. In fact, a language-dependent parser 311 in the tag instrumenter 69 and the modified compiler 66 are the only language-specific portions of the instrumentation system 61, according to an embodiment of the present invention. A language-independent instrumenter 63 in the tag instrumenter 69 comprises the language-independent analyzer 321, the language-independent symbol database 65, an information storage API 326, and an information retrieval API 323.

The language-independent instrumenter 63 eliminates the conventional dependence in code instrumenters, debuggers, and other instrumentation tools upon the output file format of a specific compiler's tool set for construction of an instrumentation symbol table. A software emulator may download an executable image to an embedded target system only if it "understands" the file format. In a conventional instrumentation system, this results in a need to customize source code instrumenters to support various compilers and linkers. Of the many compilers and linkers commercially available for block structured programming languages, most compilers and linkers contain distinctions not found in the other compilers and linkers. In other words, even compilers for the same language are not identical. Many conventional instrumentation schemes share this dependence upon a particular vendor's product by declaring instrumentation variables that depend upon reading the linker's symbol table in order to reference program symbol information. Of course, using the format required for one vendor may exclude other vendors.

In contrast, in this embodiment of the invention, the language-independent analyzer 321 creates the symbol database 65 in a language-independent manner for later use by the system 10. Thus, the symbol database 65 is produced independently of any specific compiler or the linker tool set. The information storage API 326 receives a request from the language-dependent parser 311 for a new tag value and forwards this request to the language-independent analyzer 321 which then selects a tag value and makes appropriate entries in the symbol database 65. The information storage API 326 then returns the selected tag value to the language-dependent parser 311.

In the modified compiler 66, the parser 311 associated with the tag instrumenter 69 receives source code 60 and begins parsing the source code 60 to produce an intermediate form of an abstract syntax tree ("AST") 312. The intermediate form of the AST 312 represents elementary processing of the source code 60 and, in some embodiments, may merely entail removing programming comments from the source code 60. A typical compiler parser normally builds an intermediate form of the source program 60. This internal representation of the program 60, the intermediate form of the AST 312, may now be analyzed to determine points of interest to instrument in the conventional manner.

The parser 311 parses the intermediate form of the AST 312 to continue the compilation process and to instrument the intermediate form of the AST 312 by inserting tag statements 62, thereby producing instrumented AST 322. The parser 311 instruments the intermediate form of the AST 312 by first locating a programming statement that should be tagged, according to previously identified criteria, and then signaling the language-independent analyzer 321 through the information storage API 326. The parser 311 calls the language-independent analyzer 321 to receive a new tag value when the parser 311 inserts a new tag statement into the programming code. A tag statement methodology suitable for use with the present invention is described in U.S. patent application Ser. No. 09/015,256, "Relocatable Instrumentation Tags for Testing and Debugging a Computer Program," filed on Jan. 29, 1998, now U.S. Pat. No. 6,106,571, which is assigned to a common assignee, and hereby incorporated by reference.

After the instrumented AST 322 has been produced, the compiler 310 generates the final form of the abstract syntax tree from the instrumented AST 322, thereby resulting in instrumented object code 67. The instrumented object code 67 may be linked with libraries and other object code to produce the executable code 68.

The parser 311 also passes symbolic information to the language-independent analyzer 321, such as the names of tag statements inserted into the instrumented AST 322. The language-independent analyzer 321 organizes the tagging information and other coding information from the parser 311 in a language-independent manner, passing resulting symbolic information 64 to the symbol database 65, which will be referenced by the system 10 during the running of the executable code 68. This symbolic information 64 includes items such as the current source file, the current line numbers and column numbers, the tag value, and the type of tag inserted, such as a function entry tag. The language-independent analyzer 321 looks up an available tag value and saves the tag value along with the corresponding context information in the symbol database 65. The language-independent analyzer 321 returns the tag value to the parser 311, through the information storage API 326, as it analyzes the AST 312. The parser 311 in turn inserts a tag assignment statement appropriate to the language of the program.

The parser 311 and the tag statements 62 inserted into the instrumented AST 322 are essentially isolated from tag value determinations and symbol table maintenance, both of which are handled in a language-independent manner by the language-independent analyzer 321. In addition, the symbol database 65 does not necessarily know what language has been instrumented. The system's user interface will retrieve information from the symbol database 65 that corresponds to tag values collected by the system. The user interface has no necessity for language-specific awareness. Because of its language independence, the system 10 allows monitoring of a computer program written in multiple programming languages, with the inserted tags being compatible across different languages. Thus, the tag instrumenter 69 may contain more than one language-dependent parser while only needing one language-independent analyzer 311. The system 10 also frees a programmer from having to know how symbolic information is stored in the symbol database 65.

The parser 311 and the tag instrumenter 69 may be added as a new routine to the modified compiler 66 to insert tag statements at appropriate points. In some embodiments of the invention, the parser 311 may simply replace the existing parser found in most compilers. The language-independent analyzer 321 may reside either inside or outside the modified compiler 66. The language-independent analyzer 321 may also be constructed as an information entry application program interface ("API"), according to an embodiment of the invention. An API is a library of called procedures used by an application program to direct the performance of procedures by a computer's operating system.

Once the source code 60 has been instrumented, any tool utilizing the source code instrumentation scheme may retrieve information from the language-independent symbol database 65. The tools themselves are also language-independent. The tools may display information related to different programming languages at the same time because of the language-independent instrumentation. This approach greatly simplifies the development of analytical tools because new tools only have to be developed once rather than multiple times for each supported language. The symbol database 65 may also be associated with an information retrieval API 323 that incorporates methods for facilitating the retrieval of data from the symbol database 65. For example, the API 323 may provide a set of commands for retrieving information from the database 65 using a tag value as a search key. Depending on the significance of the tag value, the API 323 may return a symbol name corresponding to the tag, a text string, or a range of characters (line number and column number range) to look up in the source code 60. Standardizing the API 323 allows tools from various vendors to be based on the symbol database 65 without necessitating that a separate symbol lookup step be written for each tool. Since the language-independent analyzer 321 has been prepared in a language-independent manner, then the instrumentation vendor may more easily provide updates for all language-independent analyzers 321 for all of the block structured languages for which tag instrumenters 69 have been produced.

The tagging instrumentation system 61 shown in FIG. 3 represents a system whose implementation generally requires the consent and assistance of a particular compiler vendor. In particular, the parser 311 and the language-independent analyzer 321 have been designed to operate together in such a manner that the parser 311 may instrument the abstract syntax tree 312 with a complete understanding of all of the nuances of the modified compiler 66. However, an instrumenter 61 may also be produced without the assistance of a compiler vendor, although such an embodiment may not operate as efficiently as the embodiment described in FIG. 3.

Utilizing a commercially available compiler together with the language-dependent parser provides two advantages. The first advantage is that the instrumenter's parser and the compiler's parser will be compatible. Compilers vary from vendor to vendor. Prior art instrumenters have been designed to work with the most widely used compilers in part by utilizing a separate instrumentation parser. Thus, from time to time, source code which has been accepted by a particular compiler vendor's parser will not be accepted by the instrumenter's parser and the opposite may also occur in that source code that is acceptable to the instrumenter's parser may not be acceptable to a particular compiler's parser. Thus, a problem may arise requiring the programmer to resolve the differences between the instrumenter's parser and each specific compiler with which the instrumenter operates. A second advantage arises from the fact that a single parser is used thus requiring only a single analysis of the code. In the prior art instrumenters, two different parser's are used. First, the compiler has its own parser, and second, the instrumenter maintains its own parser. Thus, in order to instrument and compile a piece of code, the code must be analyzed twice, which is obviously slower than processing by a single parser. For these reasons, the embodiment of the invention shown in FIG. 3 is the preferred embodiment of the tag instrumenter 69.

Figure 4:
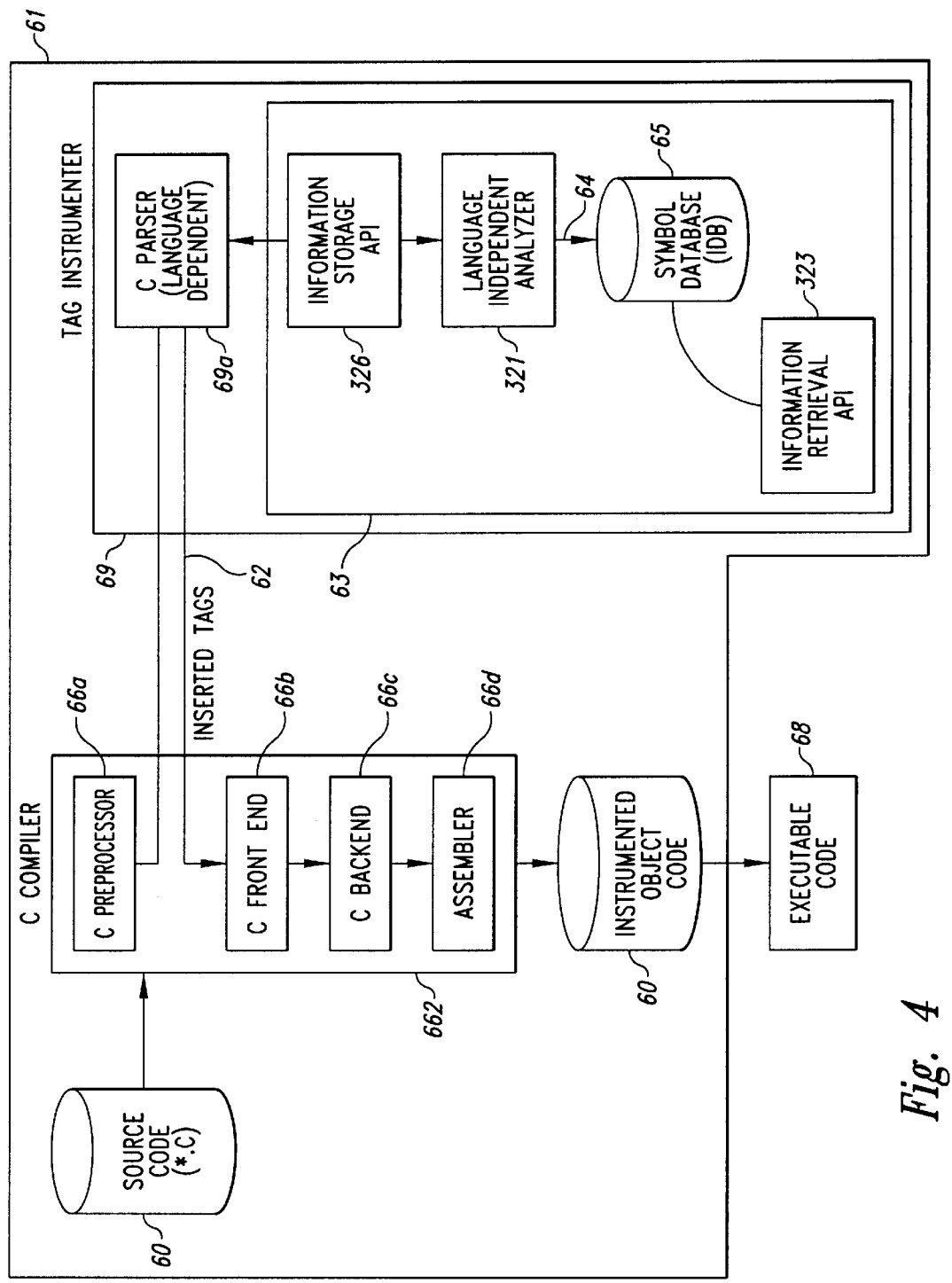
FIG. 4 is a schematic and block diagram showing an embodiment of the source code instrumentation system of FIG. 1 that performs independently of any particular compiler.

FIG. 4 illustrates an exemplary tag instrumenter having its own parser that has been inserted into the normal compilation process. The exemplary instrumentation system 61 shown in FIG. 4 operates on a C compiler 66z, although this instrumentation scheme is equally applicable in any block structured language. The C compiler 66z receives the source code 60, typically in the form of a *.c file, and processes the code into instrumented object code 67, which may then be linked to form the executable code 68. As a typical C compiler, the C compiler 66z includes a C preprocessor 66a, a C front end 66b, a C back end 66C, and an assembler 66d. The C preprocessor 66a removes information from the source code 60 such as comments that may have been added by the source code's programmer. The C front end 66b prepares an abstract syntax tree. The C back end 66c generates assembler code from the abstract syntax tree. The assembler 66d receives the assembly code from the C back end 66c and combines it with other resources to produce object code. The object code generated by the assembler 66d may then be linked with other object code to produce the executable code 68.

The normal flow of the compilation process in the C compiler 66z may be diverted by other programs. Components of the C compiler 66z, such as the C front end 66b, receive and process files from other components of the C compiler 66z in accordance with a particular naming convention. Thus, a programmer may intercept a file produced by one compiler component within the C compiler 66z, modify that file, and then provide the modified file to the next compiler component. For example, a programmer may intercept the intermediate file produced by the C preprocessor 66a and divert it to a C parser 69a. Following processing by the C parser 69a and the related tag instrumenter 69, a file having the name expected by the C front end 66b may then be forwarded by the C parser 69a to the C front end 66b for further compilation processing.

In this embodiment of the invention, the tag instrumenter 69 comprises the C parser 69a and the language-independent instrumenter 63. The C parser 69a is language-dependent. In contrast, the language-independent instrumenter 63 comprises the information storage API 326, the language-independent analyzer 321, the symbol database 65, and the information retrieval API 323, all of which may operate on any programming language. The C parser 69a analyzes the file produced by the C preprocessor 66a to determine points of interest to instrument and tag statements 62 to insert into the file produced by the C preprocessor 66a prior to its further compilation by the C front end 66b.

The C parser 69a instruments the file produced by the C preprocessor 66a with instrumentation tags 62, according to the criteria previously discussed. The C parser 69a processes the program, stopping at each point that requires an instrumentation tag 62. The C parser 69a makes calls to the language-independent analyzer 321, passing symbolic information through the information storage API 326. The language-independent analyzer 321 determines a name, an identity, and appropriate reference numbers for inserted tags 62 and forwards this tagging information to the symbol database 65. The language-independent analyzer 321 receives programming context information from the C parser 69a and also stores this information in the symbol database 65 in an appropriate location for later reference. The symbolic information 64 includes items such as the current source file, current line numbers, column numbers, tag value, and the type of tag inserted, such as a function entry tag. The language-independent analyzer 321 looks up an available tag value and saves the tag value along with the corresponding context information in the symbol database 65.

The language-independent analyzer 321 returns the tag value to the C parser 69a as it analyzes the file produced by the C preprocessor 66a. The C parser 69a in turn places a tag assignment statement in the C language into the file produced by the C preprocessor 66a. The C parser 69a and the tag statements 62 inserted into the file produced by the C preprocessor 66a are isolated from tag value determinations and symbol table maintenance which are now both handled in a language-independent manner by the language-independent analyzer 321. In addition, the symbol database 65 does not know what language has been instrumented.

The system's user interface will retrieve information from the symbol database 65 that corresponds to tag values collected by the system 10. Of course, the user interface itself has no language-specific awareness. Because of its language independence, the language-independent analyzer 321 shown in FIG. 4 allows monitoring of executable code in multiple languages, with the inserted tags being compatible across different languages. The language-independent instrumenter 63 also frees a programmer from having to know how symbolic information is stored in the symbol database 65. Once source code 60 has been instrumented, any tool based upon this source code instrumentation scheme may retrieve information from the symbol database 65.

Figure 5:
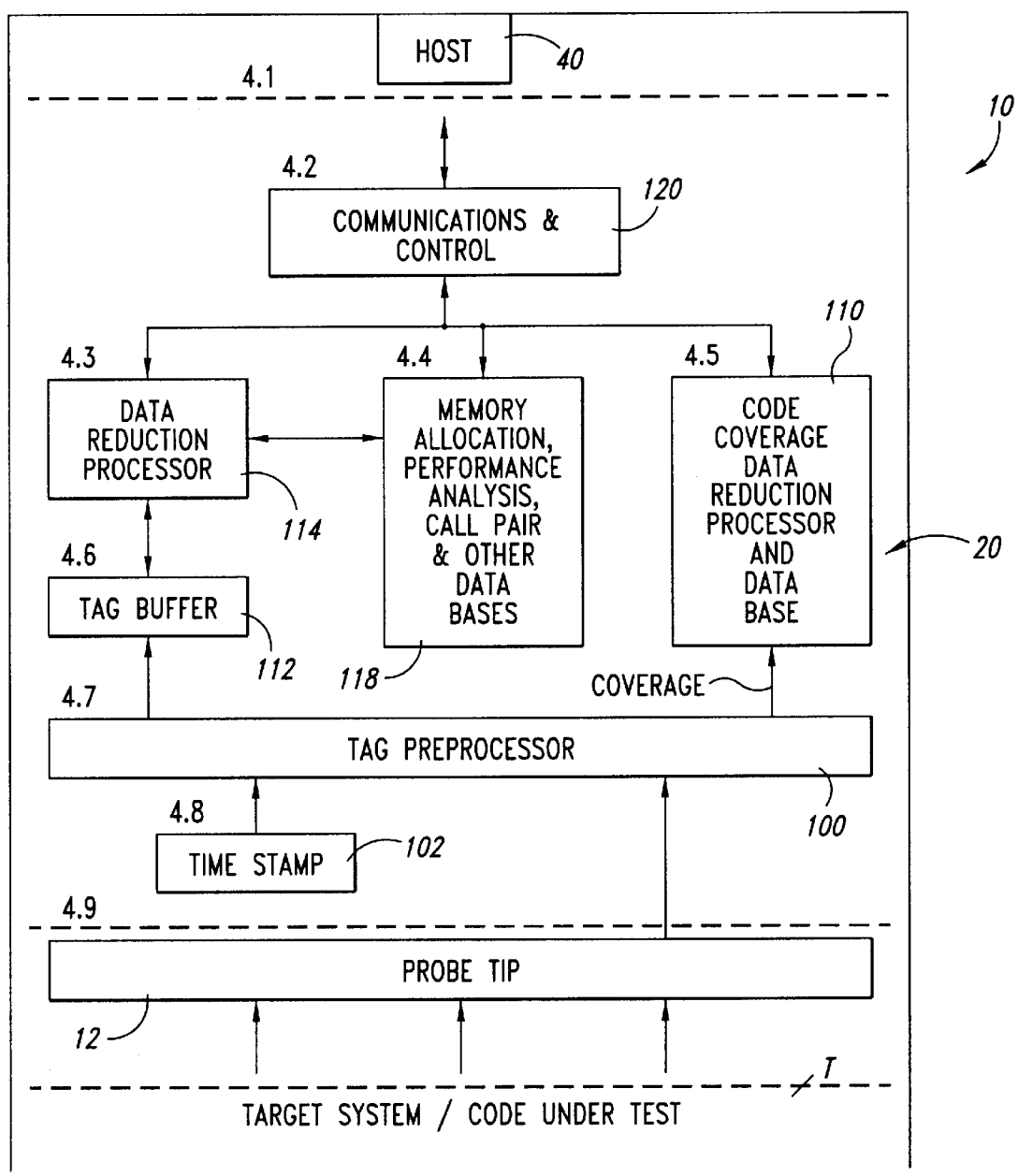
FIG. 5 is a more detailed block of the software analysis system of FIG. 1.

The software analysis system 10 of FIGS. 1 and 2 is shown in greater detail in the block diagram of FIG. 5. With reference to FIG. 5, the probe tip 12 includes a conventional LCA commercially available from Xilinx that is programmed by information downloaded from the host 40 through the probe chassis 20 to monitor one or more predetermined addresses on the address bus. When the probe tip 12 detects that one of the predetermined addresses is active, it clocks the tag on the data bus into the probe tip 12. As the probe tip 12 must interface with a specific microprocessor used by the target system T, the probe tip is specific to the particular microprocessor used by the target T. However, the probe tip 12 is the only target processor specific portion of the system 10. The probe tip 12 preferably also monitors the status bus of the probe tip 12 so that it can detect a write function to one of the predetermined addresses.

When the probe tip 12 captures each tag, it passes the tag to a tag preprocessor 100 which also receives a time stamp from a time stamp generator 102. The tag preprocessor 100 pairs the current time stamp value from the time stamp generator 102 with the tag values received from the probe tip 12. It also determines where the time stamped tag values are to be routed based on the tag type. As explained above, the tag type is defined by the value in the tag type field in the tag received from the probe tip 12. More specifically, if the tag is a coverage analysis tag generated by a tag statement placed in a branch of the source code to determine if the branch is executed, the tag is passed directly to a code coverage data reduction processor and database 110. All tag types other than coverage analysis tags are passed to a tag buffer 112. It is desirable to process the code coverage tags separately from the other tags because coverage tags are generally far more frequent than other types of tags. The tag preprocessor 100 also preferably performs some qualification on the tags before passing them to the tag buffer 112 or code coverage data reduction processor and database 110. More specifically, the tag preprocessor 100 preferably passes only the tags for the measurement being performed to minimize the number of tags that must be processed and thereby maximize the speed of downstream circuitry. The tag preprocessor 100 is preferably implemented using a conventional LCA commercially available from Xilinx that is programmed by information downloaded from the host 40 through the probe chassis 20 to perform the functions described above.

The code coverage data reduction processor and database 110 is preferably a hard-wired logic circuit, but it may also be implemented using a microprocessor and associated circuitry. The code coverage data reduction processor and database 110 converts captured code coverage tags to indices in a code coverage data base array. Each bit in the array represents a single tag value corresponding to the location in source code 60 in which the corresponding tag statements were inserted at 62 (FIG. 2). Thus, the contents of the array, which may be downloaded to the host 40, provides an indication of all instrumented branches of the source code that have been executed.

The tag buffer 112 is a high speed buffer that temporarily stores the tags received from the tagged preprocessor 110. The tags are then passed on to a data reduction processor 114. The tag buffer 112 is used to accommodate tags received in bursts at a much faster rate than can be handled by the data reduction processor 114. The tag buffer 112 can accommodate high speed bursts of tags from the tag preprocessor 100 as long as the average rate of tags passed by the tag preprocessor 100 does not exceed the processing rate of the data reduction processor 114.

Figure 6:
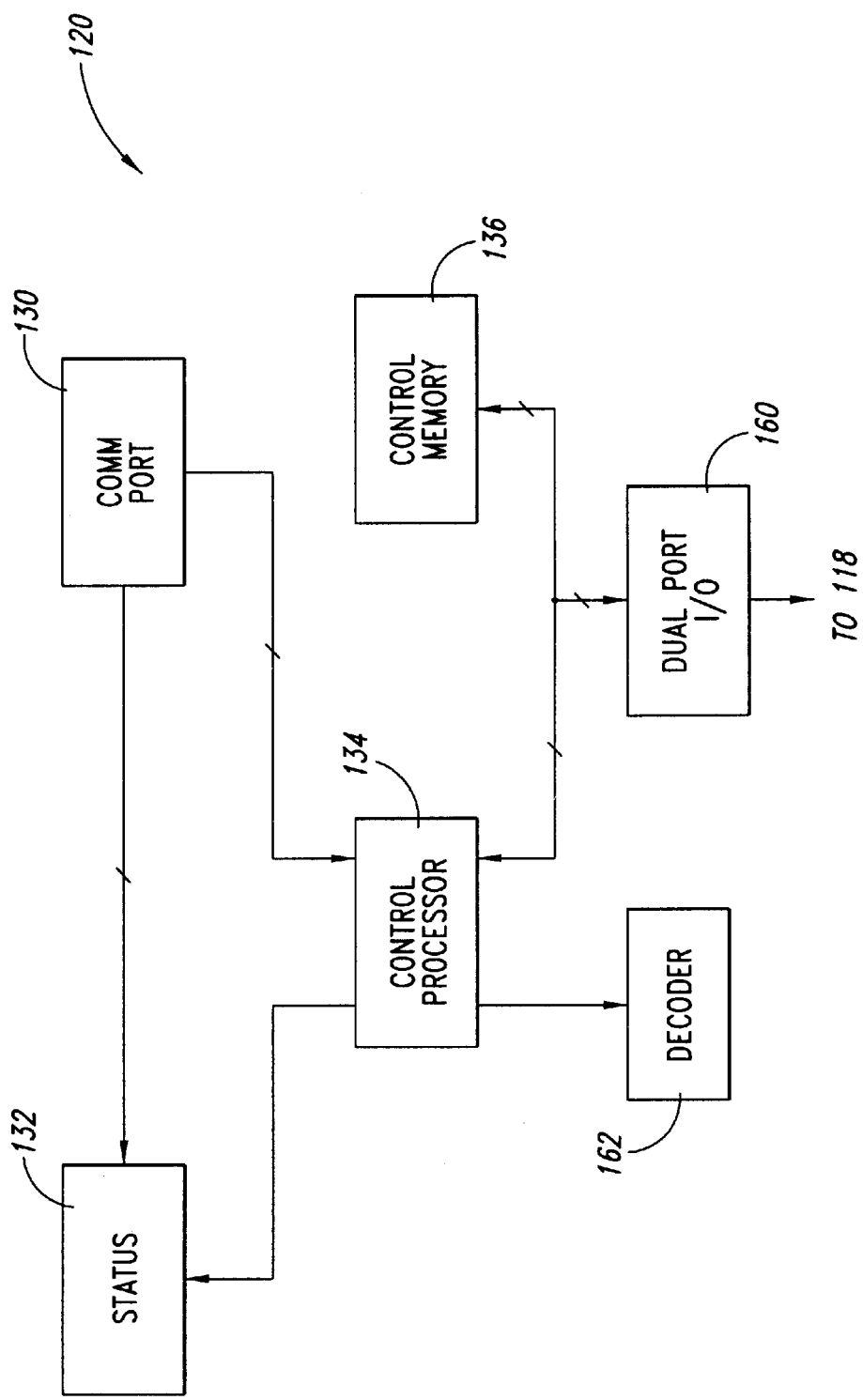
FIG. 6 is a block diagram of the communications and control circuit shown in the block diagram of FIG. 5.

The communications and control circuit 120 is illustrated in greater detail in FIG. 6. The interface between the probe chassis 20 and the host 40 consists of a standard Ethernet communication channel. The Ethernet transmission status signals are routed through a communications port 130 to a status port 132. The communications port 130 is preferably implemented with a Motorola MC68340 control processor.

As explained in greater detail below, a control processor 134 handles commands from the host software and initialization of the probe chassis 20. The control processor 134 also has direct access to the communications port 130 and a control memory 136. The control processor 130 is preferably an MC68340 microprocessor. The control memory 136 stores the instructions for the control processor 134 software as well as data storage for the control processor 134. The control memory 136 is preferably non-volatile memory, such as flash memory for code storage and DRAM for data storage. As explained in greater detail below, the control processor 134 has dual port access to the database memory 118 and database 110 to transfer data to the control memory 136.

Figure 7:
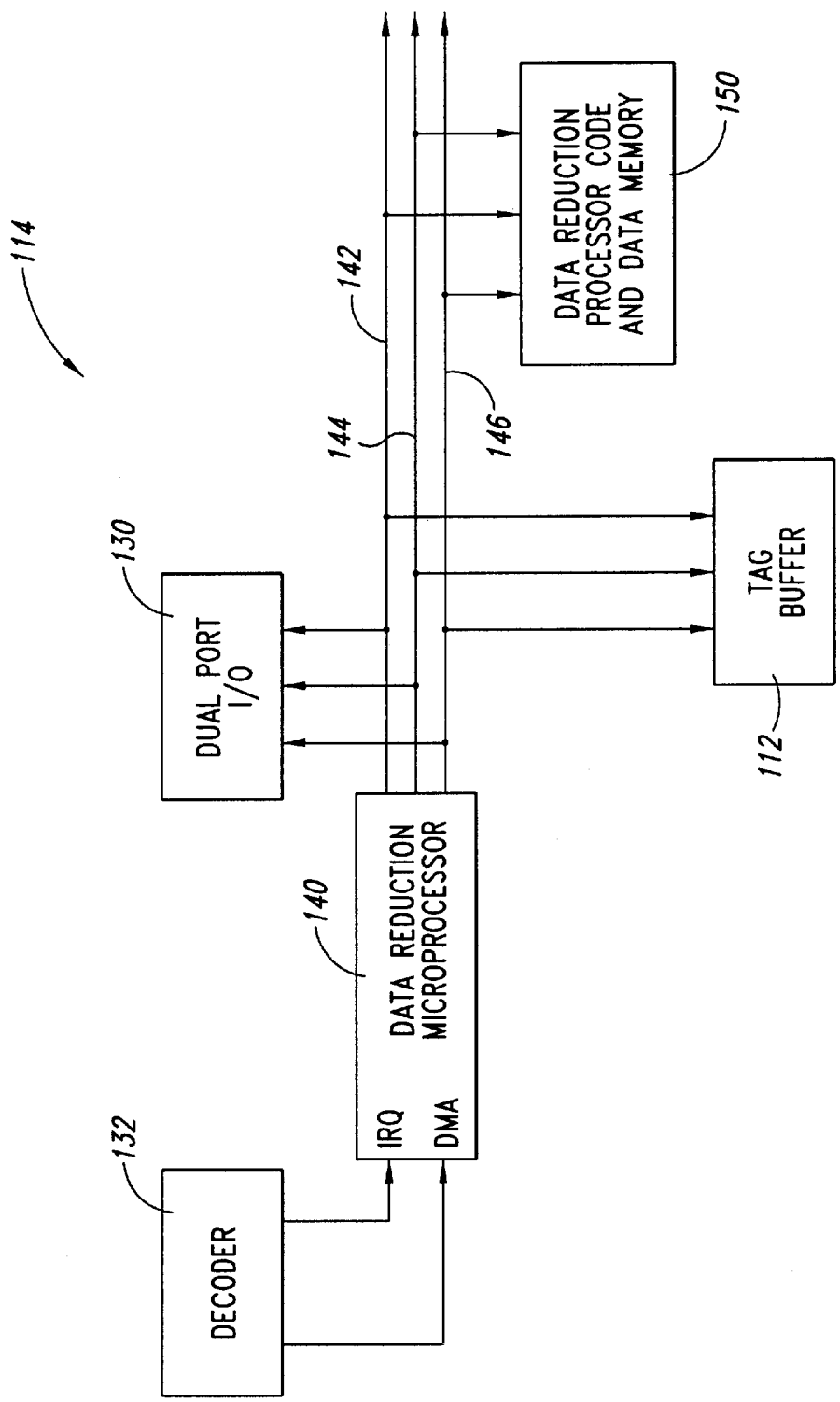
FIG. 7 is a block diagram of a data reduction processor shown in the block diagram of FIG. 5.

The data reduction processor 114 is illustrated in greater detail in FIG. 7. The data reduction processor 114 includes a data reduction microprocessor 140 having a data bus 142, an address bus 144 and a control and status bus 146 connected to the data base memory 118 (FIG. 5). The data reduction microprocessor 140 is also connected to data and code storage memory 150, the tag buffer 112 and an I/O port 160 through these buses 142, 144, and 146. The data reduction microprocessor 140 processes tags from the tag buffer 112 (FIG. 5), as explained above, under control of instructions from the code storage memory 150. The data reduction microprocessor 140 also communicates with the control processor 134 (FIG. 6) using the I/O port 160, and a decoder 132. The control processor accesses data in the data base memory 118 through the I/O port 160 under the control of the DMA and interrupt channels of the data reduction microprocessor 140. The DMA channel of the data reduction microprocessor 140 transfers data to or from the data base memory 118 and to or from the I/O port 160 each time the control processor 134 reads from or writes to the I/O port 160. This provides the control processor 134 dual port access to the data base memory 118. As a result, relatively inexpensive DRAM may be used in the data base memory 118 as dual ported memory between the data reduction microprocessor 140 and the control processor 134. Furthermore, the control processor 134, which is relatively slow, is able to effectively access the data base memory 118 using only a single bus cycle of the data reduction microprocessor 140 and minimizing the delay to the data reduction calculations.

The data reduction processor 114 performs most of the functions in the probe chassis 20. The data reduction processor 114 processes tags from the tag buffer 112 and stores resulting data in structured form in a database memory 118 for various types of performance analysis such as memory allocation, execution time, real time trace, etc. Thus, the database memory 118 stores data resulting from the capture of all of the tags other than code coverage tags. By extracting and saving pertinent data from the tags and then discarding the tags, the required capacity of the database memory 118 can be relatively small. Also, the required memory capacity is dependent only on the number of functions or task instances being monitored and not the number of tags received from the tag buffer 112. As a result of the database structure (i.e., the size of the database is proportional to the number of events monitored rather than the number of occurrences of such events), analysis of a software program can run for an indefinite period of time to be sure that the software is adequately tested and yet no data is missed, i.e., the measurement is non-sampled.

In order for the data reduction processor 114 to make meaningful measurements of an embedded software program, it must track the software execution context. Since most modem embedded programs use some kind of real-time operating system ("RTOS"), this means that the data reduction processor 114 must be aware of the RTOS execution context.

Three events which are controlled by the RTOS must be tracked: when a task is created, when a task is deleted, and when a task switch (swap) occurs. In order to accomplish this, a second instrumentation step (beyond application program source instrumentation) is required. Most modem commercial RTOS provide call outs which conveniently allow a user supplied software function to execute when a specific RTOS event occurs. A simple function linked into the appropriate call outs for the above three RTOS events outputs the appropriate control tag to indicate the kind of RTOS event, and one or more data tags to uniquely identify the RTOS task(s) affected. In a similar fashion, custom-built RTOS may be easily modified to emit the appropriate tag as well.

The data reduction processor 114 takes a different action depending upon which RTOS tags are received. When a "task create" tag is received, the data reduction processor 114 establishes in memory a stack area for the task. When a "task delete" tag is received, the data reduction processor 114 deletes the stack after tabulating any remaining measurement results into the appropriate data base. When a "task switch" tag is received, the data reduction processor 114 suspends any measurement activity for the current task stack, and switches to another stack which corresponds to the task ID received (as a data tag).

The data reduction processor 114 also tracks context at the function level within each task using tags emitted at each function entry and exit point. When a switch to a task occurs, the data reduction processor 114 will receive a function entry tag from the first function in the task and will record the entry on the stack (e.g., function "A"). If a second function ("B") entry tag is received prior to the exit tag for function A, function B's entry tag is recorded on the stack, and the data reduction processor 114 "knows" that a function nesting has occurred, i.e., A has called B. For performance measurement purposes, the time stamp corresponding to each tag is recorded on the stack as well.

When a context change occurs such as a task swap (e.g., from task "Y" to task "Z"), the current time is recorded on Y's stack such that no further execution time will be attributed to it while the program executes other tasks. The data reduction processor 114 then switches to the stack corresponding to task Z and begins tracking time for each tag emitted while executing task Z. Should the RTOS swap back to task Y, the times and function nesting of task Z are "frozen," as described for task Y above. The data reduction processor 114 then points back to Y's stack, and the appropriate timers resume counting time where they left off. Since the function hierarchy context of task Y has been preserved on Y's stack, the system is able to accurately track the continuation of task Y's activity. When a "delete task" tag is received, any execution information preserved on the task's stack is tabulated a final time in the appropriate data base.

This context tracking method enables many sophisticated qualifications of program measurements based upon software execution context. Performance measurements may be qualified such that function execution time is tracked only when the program is executing a particular task thereby eliminating executions from a different context of functions shared between two or more tasks. While performance measurements have been described as a typical example, other measurement qualifications are equally possible and desirable. For example, a trace history measurement can also be qualified by the software context such that tags will only be stored in the trace buffer when executing in a particular task, or a particular function nesting hierarchy. Memory allocation could be tracked only when the program is executing in a particular task context, etc.

The data reduction processor 114 performs call pair measurements by tracking which functions called other functions by identifying consecutive function entry tags generated by respective tag statements in the source code for the calling and called functions. The data reduction processor 114 updates this information each time a new function entry tag is received. The resulting data can be stored as either a count of executions of each call pair or a flag indicating at least one execution of each call pair.

Finally, the data reduction processor 114 performs memory allocation measurements based on receiving from the tag buffer 112 memory allocation tags generated by tag statements inserted into allocation statements in the source code. These memory allocation tags (including control tags and data tags) indicate how much memory was allocated or freed by each call to a memory allocation function, and where the call occurred in the source.

The design goal for memory allocation tagging is to record successful allocations and deallocations, including the original allocation size and site (caller identifier), and allocation errors, including block overwrites, block underwrites and heap corruption (i.e., writes out of bounds references), writes to deallocated blocks, and erroneous arguments to interface routines (e.g., wild pointers). Allocation errors require a memory-checking allocator. In the absence of a memory-checking allocator, an instrumented interface to the standard memory allocation routines may be used to monitor successful allocations and deallocations and generic error cases.

Implementing memory allocation tagging includes an error-checking memory allocator and an instrumented interface to it, a set of instrumentation rules for modifying user code, and a set of replacements for the standard memory allocation routines. The error-checking memory allocator is based on a straight forward heap-based memory allocator.

The interface to the allocator is based on the standard memory allocation routines, augmented with the addition of a memory management tag (e.g., augmented-malloc). The tag encodes the kind of the memory [de] allocation call (e.g., malloc, realloc, free, etc.), and the caller identifier. Information about each allocation is kept, including the requested size and the caller identifier of allocation site; for later reference when the block is deallocated, or an error is discovered in the block.

When a block is successfully allocated, a data and control tag are written to announce the allocation, including the size for the allocated block (a data tag), and the kind and caller identifier of the allocation (a control tag). When a block is successfully deallocated, a data and control tag are written similar to that for a successful allocation, including the size for the allocated block, the kind of the deallocation, and the caller identifier of the allocation.

The base allocator is augmented with error checking, including verification of the arguments to the allocation and deallocation routines, the integrity of each block present in the heap, whether currently allocated or freed, and the integrity of the heap as a whole. When an error is identified, a set of data and a control tag are written to indicate the error. The information present in the tags include an error identifier, the address of the block in error and its size (if any), the caller identifier(s) of the block's allocator and deallocator (if any), and the kind of allocator call begin attempted when the error was discovered.

Instrumented C code, which calls the standard memory allocation routines, is changed to replace the original calls with calls to the corresponding instrumented interface, which allows for the addition of a memory management tag, as described above. Uninstrumented C code, which calls the standard memory allocation routines (e.g., precompiled libraries), is provided for by a set of routines with the same signature as the standard routines, but which call the corresponding instrumented interface, and pass an "unknown" caller identifier.

In addition to the provisions made for C code as described above, instrumented C++code must also handle the use of the global versions of operators new and delete.

For instrumented C++code which calls the default operator new, a file local definition is supplied, using placement syntax, which augments the standard operator new signature with a memory management tag argument. Uses of the default operator new are replaced with calls to the augmented version, whose definition simply calls the instrumented interface to the allocator (i.e., augmented-malloc). For uninstrumented C++code, a default version of global operator new is provided which calls augmented-malloc with an "unknown" caller id.

For instrumented C++code which calls the default operator delete, a file global definition of the operator delete operator is provided which retains the address of the function call to prevent errors from occurring during a multiple inheritance object delete. In a multiple inheritance object delete, the actual portion deleted depends upon which inheritance is being deleted. Accordingly, the file global definition must retain the exact address. Calls to an operator delete are followed by a call to the instrumented interface (i.e., augmented-free), along with an appropriate memory management tag. For uninstrumented C++code, a default version of the global operator new is provided which calls augmented-free with an "unknown" caller ID.

Returning to FIG. 5, the probe chassis 20 communicates with the host 40 through a communications and control circuit 120. Under command of the host processor 40, the communications and control circuit 120 can directly access data stored in the database memory 118 or the code coverage data reduction processor and database 110 so that such data can be transferred to the host 40 for further processing and display. The communications and control circuit 120 also routes commands from the host 40 to the probe chassis 20 to select the mode of probe operation, including specifying the function to be performed and the tag types to be collected.

Figure 8:
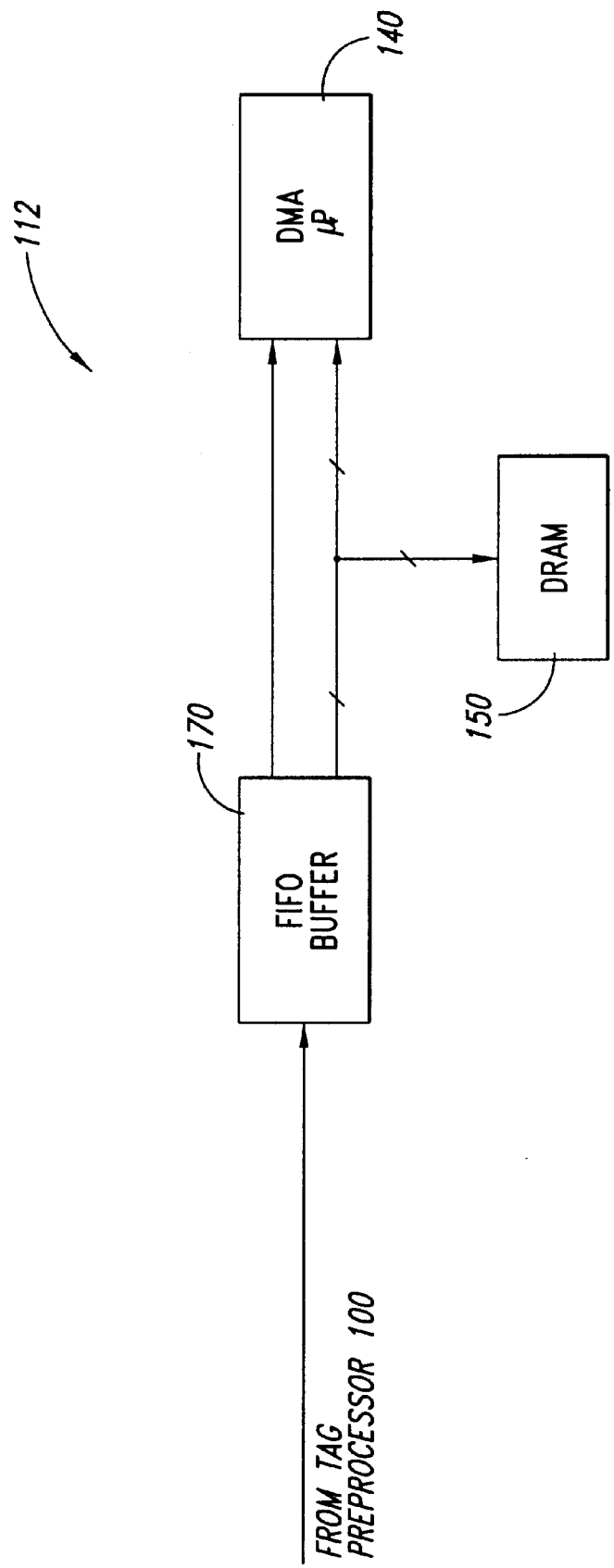
FIG. 8 is a block diagram of a tag buffer shown in the block diagram of FIG. 5.

The tag buffer 112 (FIG. 5) is shown in FIG. 8 along with its interface to the data reduction processor 114. As explained above, tags are often captured by the probe tip 12 in bursts at rates that exceed the maximum processing rate of the microprocessor 140. One apparent solution to averaging the tag capture rate is to use a first-in first-out ("FIFO") buffer. However, FIFO buffers capable of operating at high rates of speed having sufficient capacity to store large numbers of tags are relatively expensive. The tag buffer 112 illustrated in FIG. 6 is able to effectively implement a large capacity, high speed FIFO buffer using a high speed, low capacity FIFO buffer 170 of conventional design. The FIFO buffer 170 normally receives tags from the tag preprocessor 100 (FIG. 5) and sequentially outputs those tags to the microprocessor 140. The microprocessor 140 then stores the tags in the DRAM 150 while awaiting data reduction and processing. However, in the event that the relatively low capacity FIFO buffer 170 becomes filled, it outputs a bit to the direct memory access ("DMA") input of the microprocessor 140. The microprocessor 140 then allows the FIFO buffer 170 to write data directly to the DRAM 150, thereby speeding up the writing of data in the DRAM 150.

Figure 9:
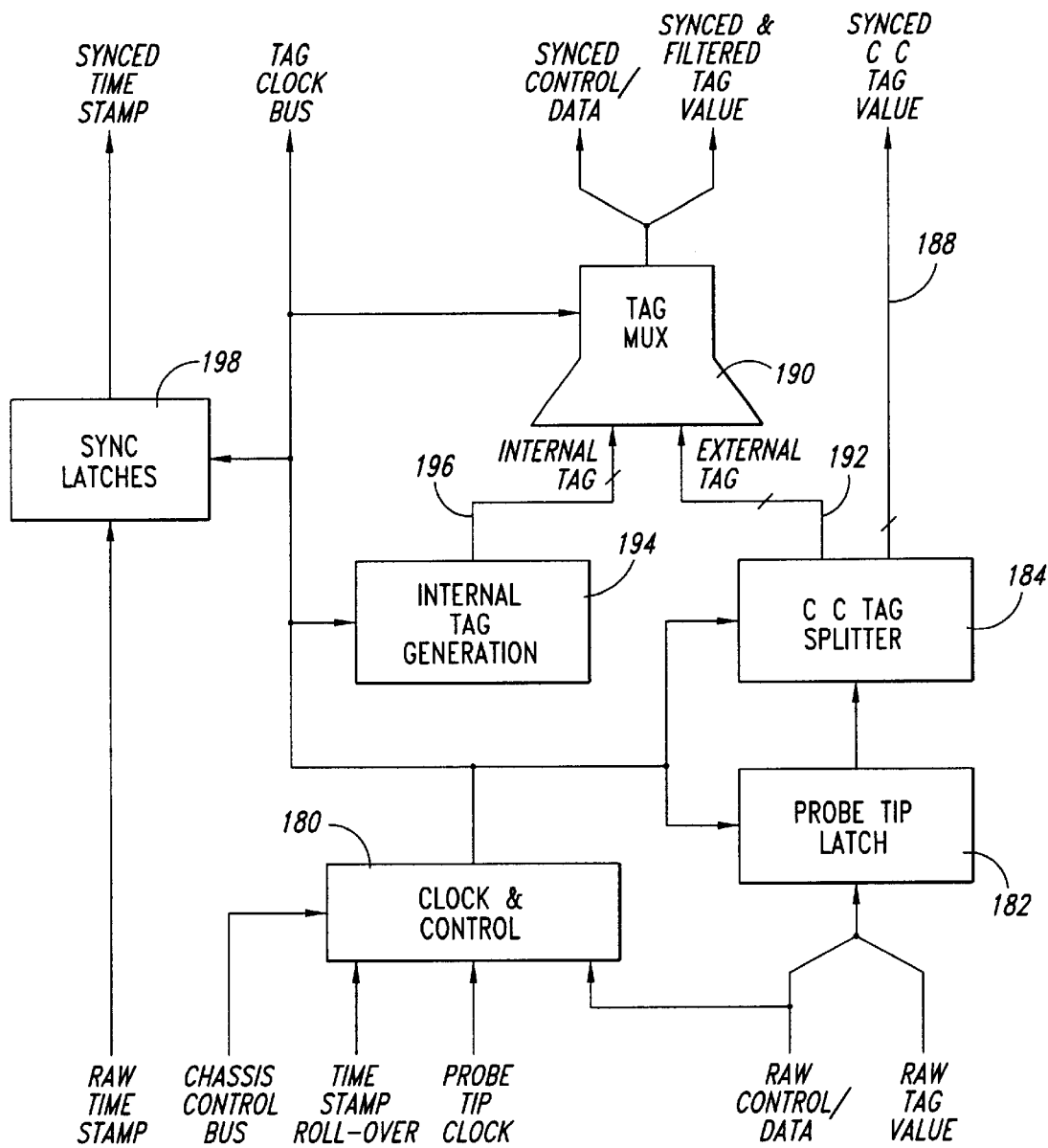
FIG. 9 is a block diagram of a tag preprocessor shown in the block diagram of FIG. 5.

As mentioned above, the tag preprocessor 100 combines the tags received from the probe tip 12 with a time stamp received from the time stamp generator 102 and routes them to either the data reduction processor 114 or the code coverage data reduction processor and database 110. The tag preprocessor 100 is shown in greater detail in FIG. 9. A clock and control circuit 180 interfaces with the time stamp generator 102 (FIG. 5), a clock signal received from the probe tip 12 and control bits from the data reduction processor 114. The clock and control circuit 180 then controls the operation of other components in the tag preprocessor 100. The tag preprocessor 100 includes a probe tip latch 182 that, when triggered by the clock and control circuit 180, latches into the tag preprocessor 100 the tag type field and the tag value. Based on the tag type, a code coverage tag splitter 184 routes the tag to either the code coverage data reduction processor and database 110 (FIG. 5) via bus 188 or to a tag multiplexer 190 via bus 192. The tag preprocessor 100 also includes an internal tag generator 194 that can apply an internal tag to the tag multiplexer 190. The data reduction processor 114 controls the tag multiplexer 190 to apply either the internal tag on bus 196 or the tag from the probe tip 12 on bus 192 to the tag buffer 112. Finally, a synch latch 198 latches in the tune stamp at the appropriate time under control of the clock and control circuit 180 so that the time stamp is synchronized to the currently captured tag.

Figure 10:
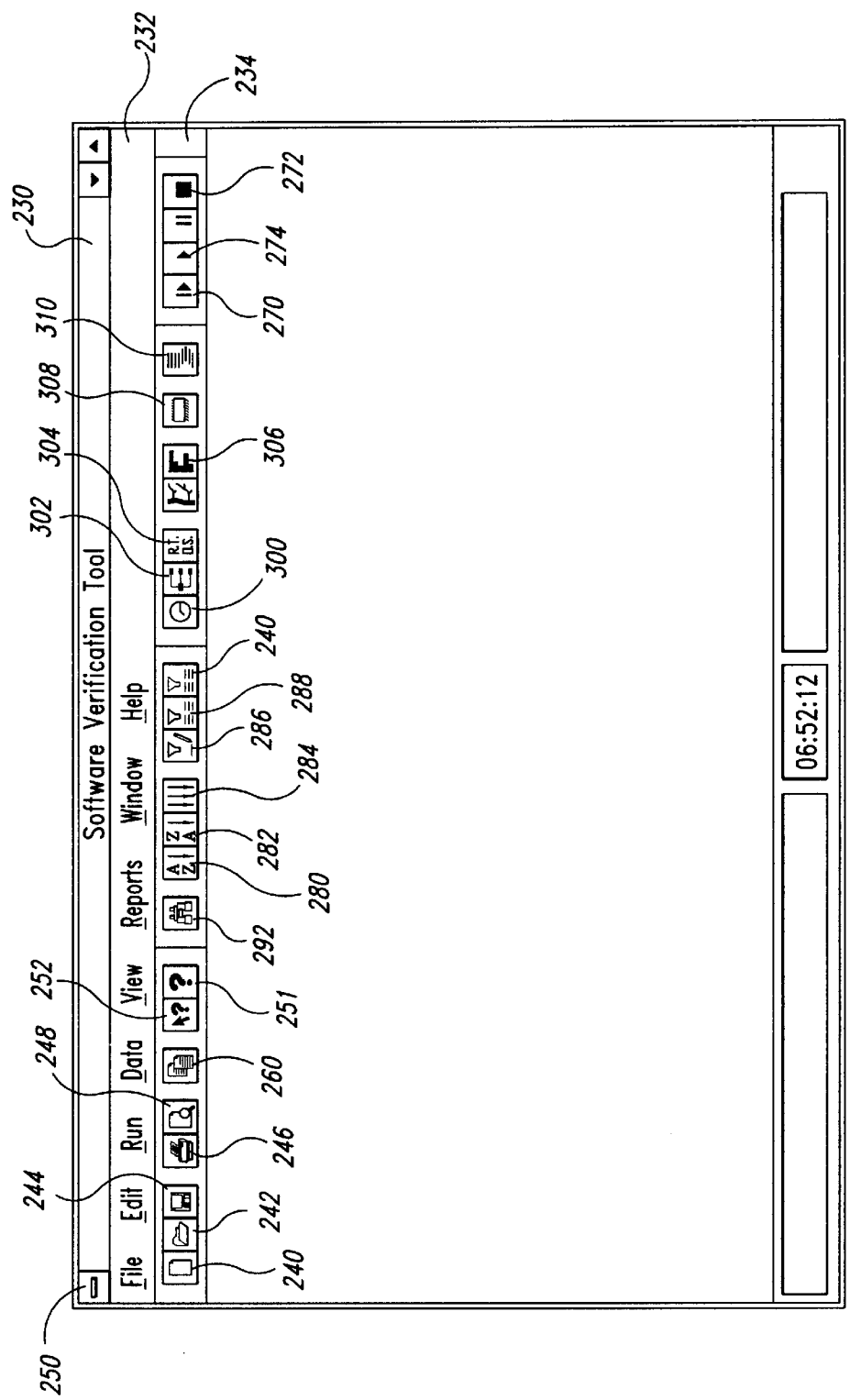
FIG. 10 is a screen display of the command window for the software analysis system of FIG. 1.

The user interface for the host system 40 is best illustrated with reference to the user interface command bar shown in FIG. 10. During the operation of the software analysis system 10, the display screen 48 of the monitor 46 (FIG. 1) displays a title bar 230 at the upper portion of the screen. A command bar 232 for entering commands into the system 10 is positioned below the title bar 230. Finally, a tool bar 234 adapted to allow direct entry of commands available in the command bar 232 is positioned beneath the command bar 232. Most of the file commands available in the command bar 232 may be directly selected by clicking on appropriate icons of the tool bar 234 using a pointing device, such as a mouse. A new file icon 240 causes the system to save unsaved data, closes any open views on the screen and invokes a configuration dialog to allow configuring for a new task. An "open" icon 242 invokes a dialog for loading and displaying analysis results saved from a prior test. A "save" icon 244 invokes a file save dialog to save analysis data resulting from a test. The save command presumes that the data has already been given a file name. If not, the file save dialog requests the user to enter a file name under which the data is saved. A "print" icon 246 invokes a print dialog which allows the software analysis system to print reports showing analysis data or subsets of data. A print preview icon 248 allows the viewer to view on the screen how the printed document will appear. The user can exit the Windows® software by either double-clicking on an exit bar 250 or selecting "exit" as a file command in the command bar 232.

The edit command in the command bar 232 consists of a single command, namely, a "copy" command. This command, which can be entered by selecting a "copy" icon 260 in the tool bar 234 copies selected data into a clipboard (i.e., temporary storage) so it can be pasted into another application, such as a spreadsheet program.

Several run commands available from the command bar 232 may also be entered through the tool bar 234. A "run" icon 270 erases any previously acquired data and begins the acquisition of data from the probe 12 while performing an analysis function. A "halt" icon 272 halts data acquisition from the probe until a resume icon 274 is selected. There are a large number of data commands that can be selected from the command bar 232 or from the tool bar 234. A "sort ascending" icon 280 sorts in an ascending order active data acquired from an analysis by values in the selected column. Similarly, selecting a "sort descending" icon 282 causes the acquired data to be sorted in a descending order. Selecting a "sort multiple" icon 284 invokes a sort dialog for setting up a multi-level sort.

An "edit filter" icon 286 invokes a filter dialog for setting up a data filter for an active view. Filtering a display causes only selected measurement results to be displayed, i.e., only the functions of interest. An "apply current filter" icon 288 causes the system to apply a previously specified filter to the active data view. A "show all" icon 290 removes the data filter so that all of the acquired data is displayed in the active view. A "find" icon 292 invokes a find dialog for setting up a search within an active view.

A variety of data commands can also be entered through the command bar 232 or directly through the tool bar 234. A "function performance" icon 300 is selected to invoke a function performance table to display function performance data that has been acquired from the probe or loaded from a file stored from a previous analysis. A "task performance" command can be selected from the view menu in the command bar 232, but there is no corresponding tool bar. A "task performance" command displays previously acquired task performance data from either the probe or a file. A "call linkage" performance icon 302 invokes a call linkage table to display call pair data from the probe or from a file of call pair data acquired in a previous test. A "branch coverage" icon 304 is selected to invoke a branch coverage table to display coverage data from the probe or from a file saved from a previous test. A coverage summary graph icon 306 invokes a coverage summary graph to display a statistical record of coverage data from the probe or from a file stored from a previous analysis. A "memory allocation" icon 308 is selected to invoke a memory allocation table to display memory allocation data acquired from the probe or from a file saved from a previous test. Finally, a "trace analysis" icon 310 invokes a trace view in the display window to display trace data acquired from the probe or from the file saved from a previous test.

The command bar 232 also allows standard Windows® commands such as hiding or showing the tool bar 234, cascading or tiling open view windows, arranging icons, etc. The tool bar 234 also includes an index icon 250 to invoke a top level contents page for on-line help in operating the system 10 and a second "help" icon 252 which may be "dragged" and "dropped" to any item on the display to obtain help about that item. Thus, the Windows® user interface allows the software analysis system to be easily and quickly operated by relatively inexperienced personnel. A similar user interface running on UNIX® workstations utilizing a X-11 windowing system provides similar ease and speed of use.

Figure 11:
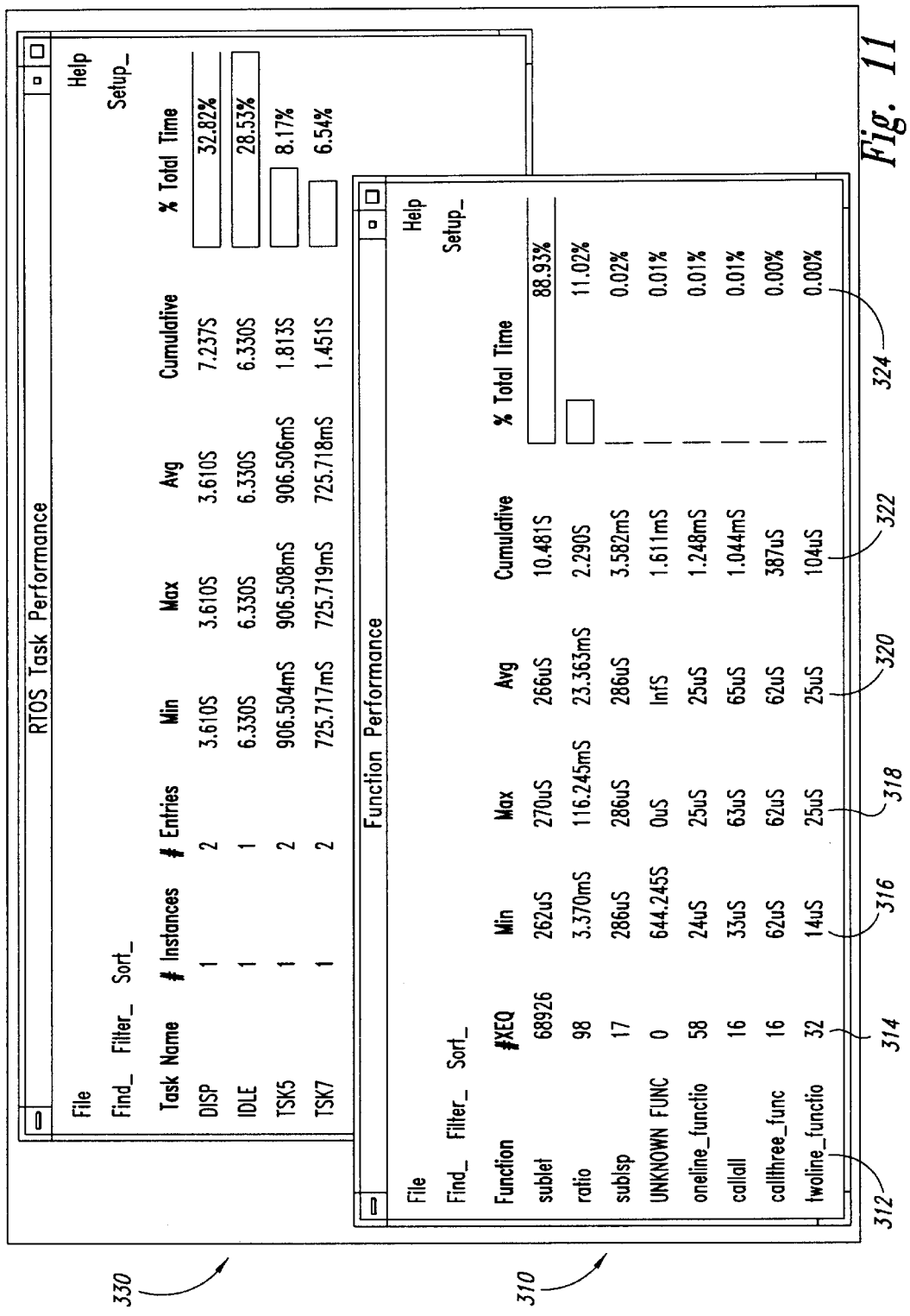
FIG. 11 is a screen display showing the results of two different types of software performance analysis.

Examples of performance analysis displays are illustrated in FIG. 11 for both task performance and function performance. The function performance display 310 includes a first column 312 listing various functions performed by the source code followed by a column 314 showing the number of times each of those functions was executed. Time columns 316, 318, 320 then show the minimum, maximum and average time, respectively, required to executed each of the functions listed in the column 312. The cumulative time spent in executing each of the functions (i.e., the product of the number of executions in the average) is then displayed in column 322. Finally, column 324 displays the percentage of time that each of the functions listed in the first column 312 were being executed. The data in column 324 can be calculated as the ratio of each entry in column 322 to the sum of the entries in column 322.

A task performance analysis display screen 330 is similar to the function performance analysis display screen 310 and, in the interest of brevity, its explanation will not be repeated. The performance analysis ratios shown in column 324 can also be displayed as a bar graph histogram.

Figure 12:
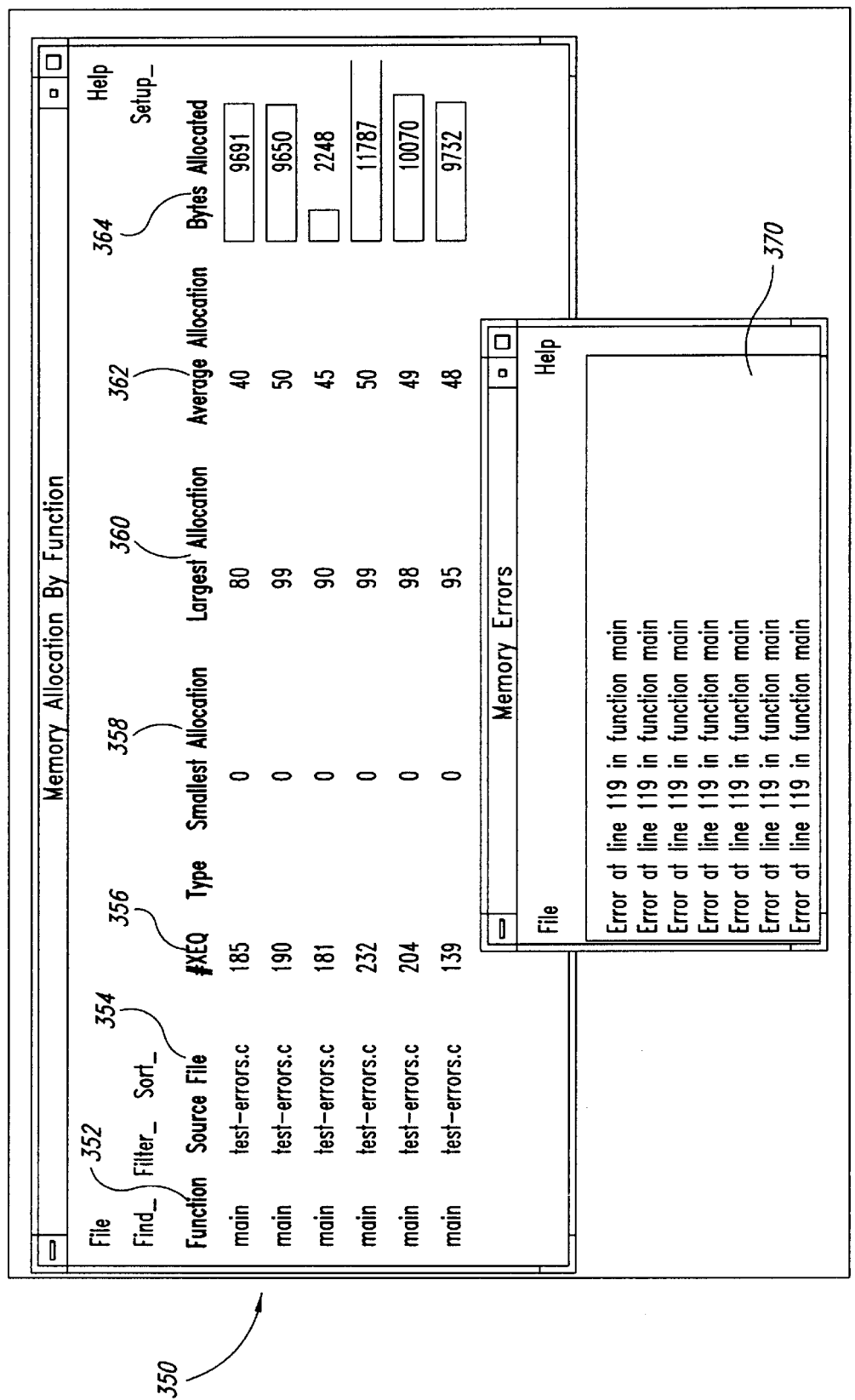
FIG. 12 is a display screen showing the results from a memory allocation analysis.

As explained above, the software analysis system 10 can also perform a dynamic analysis of memory allocation, and an example of the display of data from such analysis is shown in FIG. 12. A memory allocation screen 350 includes a first column 352 listing each of the functions containing a memory allocation statement. A second column 354 lists the source file for each of those functions. The next column 356 lists the number of times each of those functions were executed and the next three columns 358, 360, 362 lists the smallest memory allocation, the largest memory allocation and the average memory allocation, respectively. The final column 364 contains a bar graph and a digital display of the memory bytes currently allocated. By viewing the bar graph in column 364, the operator can examine in essentially real time the allocation of memory in the target system as the software is being executed. Appearing with the memory allocation display 330 is a memory error display 370 that lists each of the memory errors found during the memory allocation analysis.

An example of a call linkage table resulting from a call pair analysis is shown in FIG. 13. A call linkage display 380 dynamically tracks a number of function linkages by listing in a first column 382 the calling functions and in a second column 384 called functions. The number of times each of the calling functions has called the call function is then listed in a third column 386 in both digital form and in a bar graph.

Figure 14:
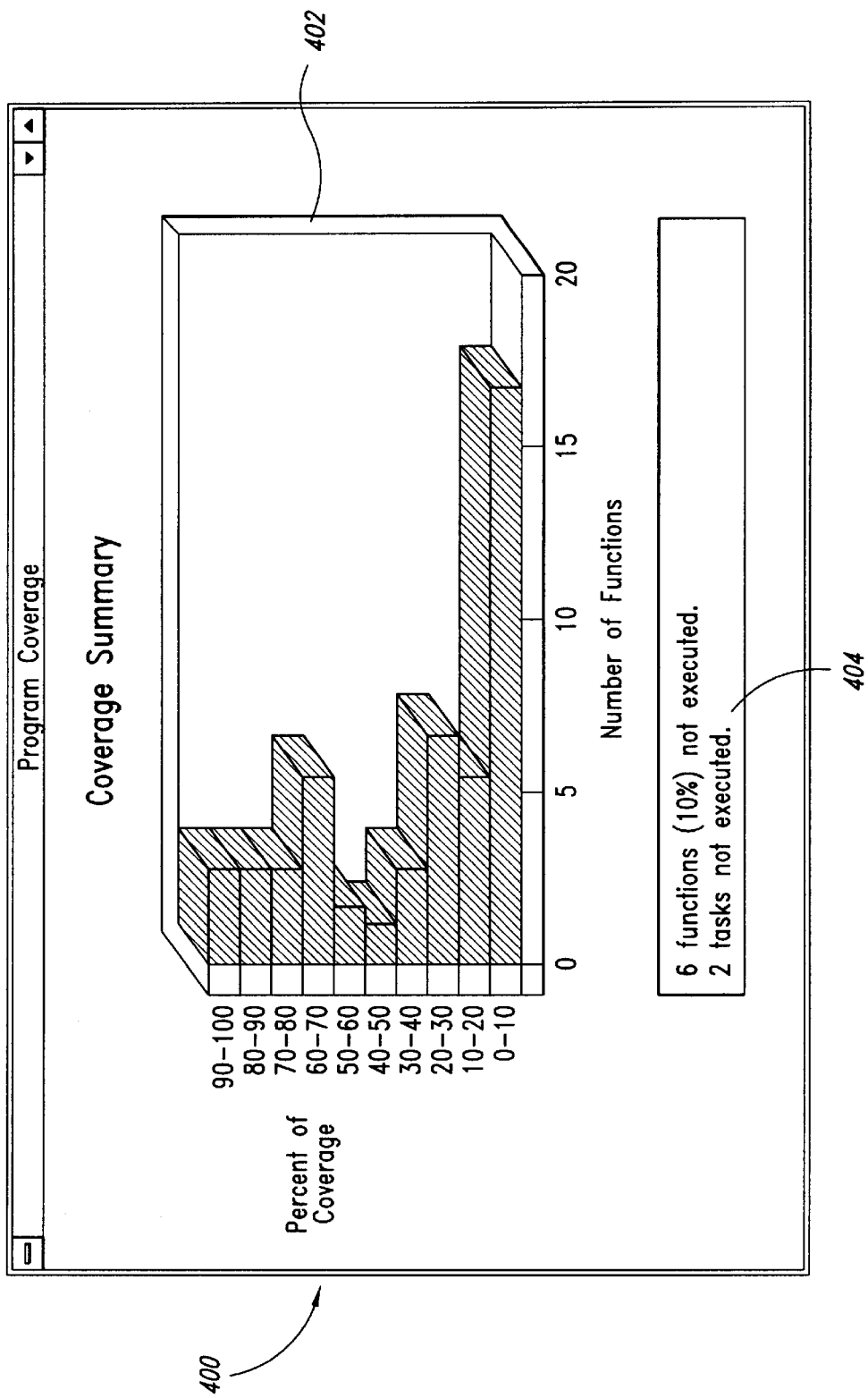
FIG. 14 is a display screen showing the results of a code coverage analysis performed by the software analysis system of FIG. 1.
Figure 15:
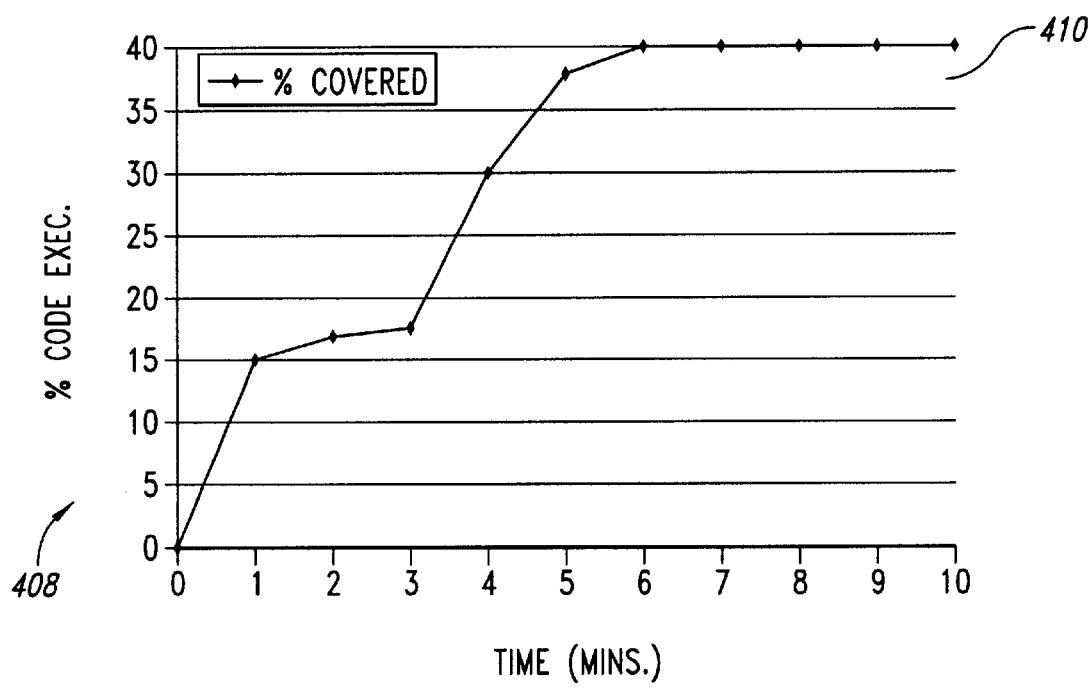
FIG. 15 is a screen display showing another presentation of the results of a code coverage analysis performed by the software analysis system of FIG. 1.

As explained above, the source code bit can be instrumented by placing a tag statement in each branch to assess call coverage, i.e., the number of branches executed and the frequency of execution of each branch. An example of a code coverage display 400 is illustrated in FIG. 14. The code coverage display 400 includes a bar graph 402 showing the overall level of coverage achieved during a test. Functions are categorized in percentile ranges along the vertical axis, and the number of functions that fall within each range grouping is indicated on the horizontal axis. The total number of functions and tasks not executed are listed at the bottom of the display at 404. This listing 404 can alert the operator to portions of the software that are apparently not being executed. An alternative code coverage display 408 consists of a line graph 410 depicting the percentage of coverage achieved over the period of time conducting the test, as illustrated in FIG. 15. The code coverage graph 410 of FIG. 15 shows that 15% of the code was executed during the first minute, the rate of code coverage increased only marginally for the next two minutes, and the rate of code coverage then increased at a much faster pace for the next two minutes until leveling off at 40% coverage.

Figure 16:
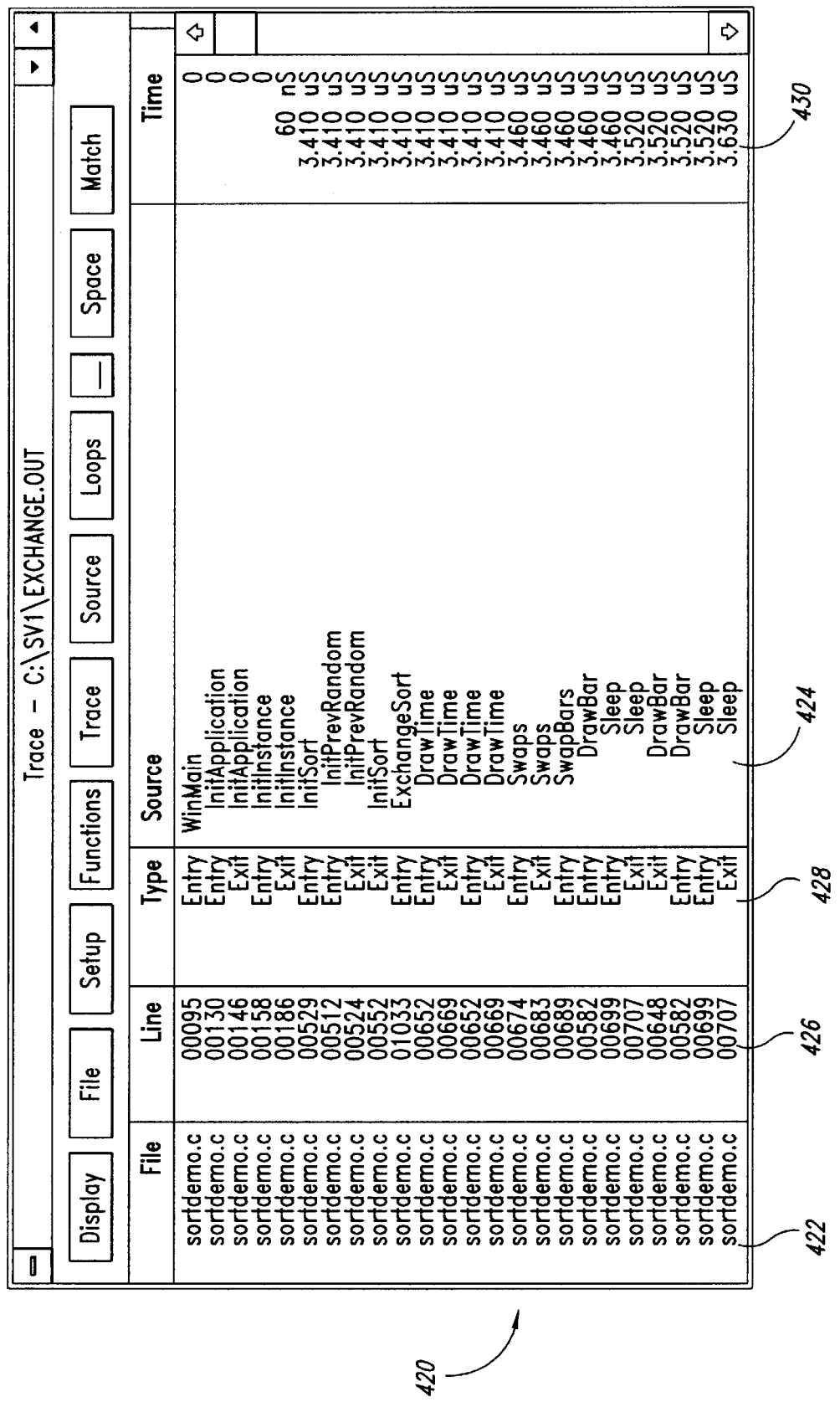
FIG. 16 is a display screen showing the results of a high level trace performed by the software analysis system of FIG. 1.
Figure 18:
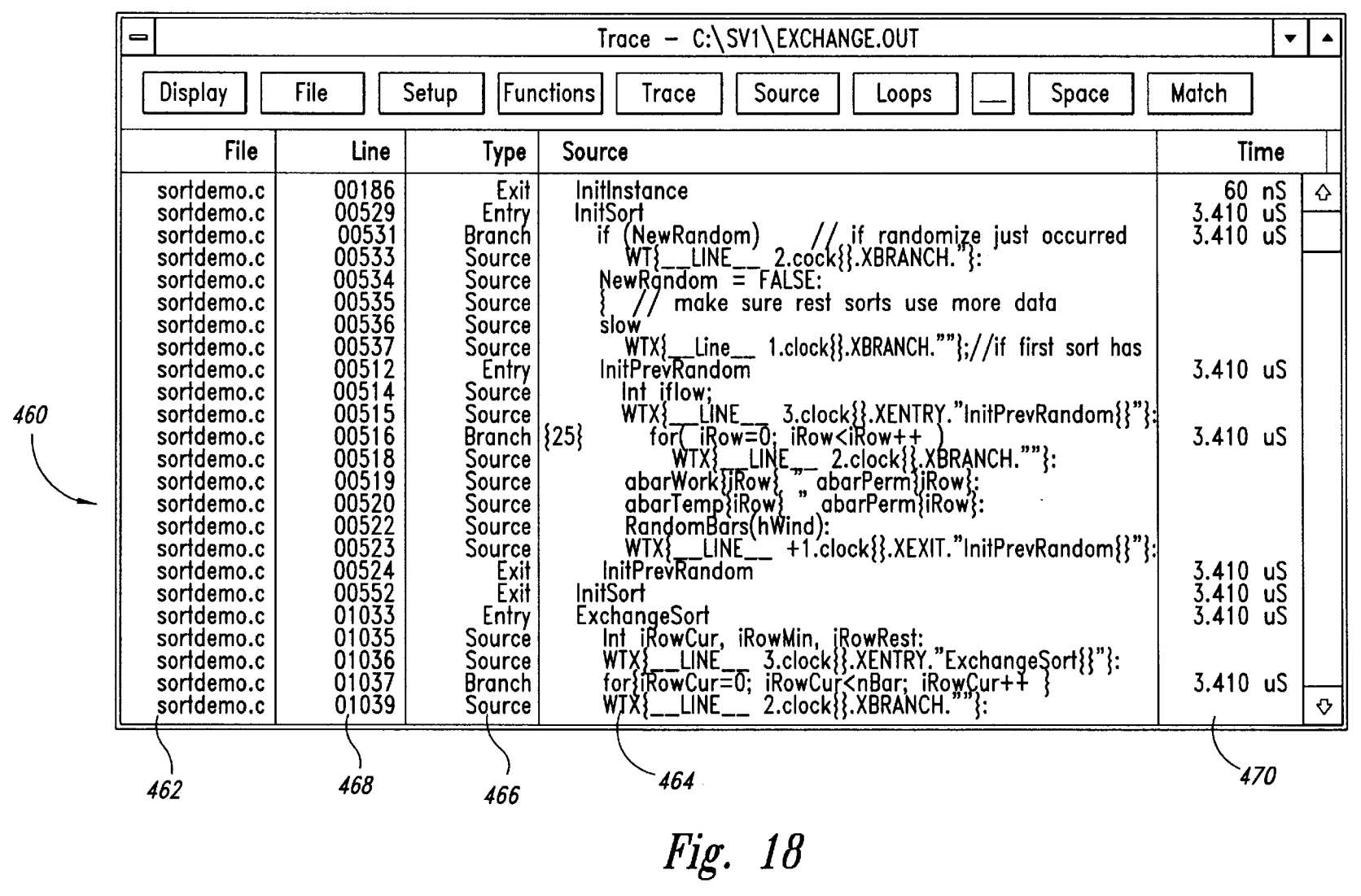

The trace function as described above can be displayed in at least two different modes. A high level trace display 420 shown in FIG. 16 is preferably the default view upon entry in the trace mode. The display 420 contains a time ordered list of nested function entry and exit points and RTOS task events. The display includes a column 422 showing the source file for the software, a column 424 showing the functions in the order that they are executed, a column 426 showing a line number of that function, and a column 428 designating whether the traced function was an entry or exit point. A relative time stamp for each function is listed in a right-hand column 430. Alternatively, the results of a trace can be displayed in a control flow display 440 shown in FIG. 17. A control flow display shows time-ordered listing of all function points, executed branches and real time operating system events in the trace buffer. As with the high level display 420, the control flow display displays the source file in a first column 442, the tasks, functions, and branch points in the order that they are executed in a third column 444, whether the function is an entry point, an exit point or a branch in column 446 and the line number of the point in line 448. As before, the right-hand column 450 lists a relative time stamp for each point. Finally, the results of a trace can be displayed in a source view display 460 shown in FIG. 18. A source view display shows every line of executed software, although loops can be expanded or collapsed. The display 460 interpolates source lines which, by inferences, were executed. This determination of execution is made by retrieving those source code lines which comprise the basic block in which each branch tag is located. Function entries and exits, branches, RTOS events, and other executed liens of software of interest preferably may be color coded. As with the other trace displays shown in FIGS. 16 and 17, the source view display 460 displays the source file in a first column 462, the function in the order that they are executed in a third column 464, whether the function is an exit point, an entry point, or a branch in column 466, the line number of the point in column 468, and a relative time stamp for each point in column 470.

As previously discussed, embodiments of the invention are particularly applicable to the testing of software for embedded systems. Many embedded systems have recently begun to use processors that include large internal cache memories. During operation of these systems, large amounts of programming instructions and data may be processed using the cache memory exclusively. In such systems, considerably less information may pass along the data bus and the address bus than in systems without an internal cache memory. Thus, embedded systems with large amounts of internal cache memory may frustrate many tagging instrumentation schemes because data does not regularly flow out of the embedded processor for capture by a probe.

The invention is not limited to the testing of software in embedded systems and is applicable to testing computer programs in any environment in which executable programming statements may be instrumented with tagging statements prior to execution. A probe, such as the probe tip 12, represents but one mechanism for detecting tags during a program's execution. Other detection mechanisms include writing tag values to a file which for subsequent analysis and capturing tag values passing during an external function call.

For example, detection of tags in a cache memory does not require the use of a probe. Detecting executed tag statements from a cache memory requires an ability to capture data as it is being written across a communications network. The tags do not have to perform a function call but may merely write data outside the cache memory. A suitable detection mechanism for this operation could be a probe, a write operation to a disk file, a write operation to local memory, or a function call accessing telecommunications software outside the cache memory.

Figure 19:
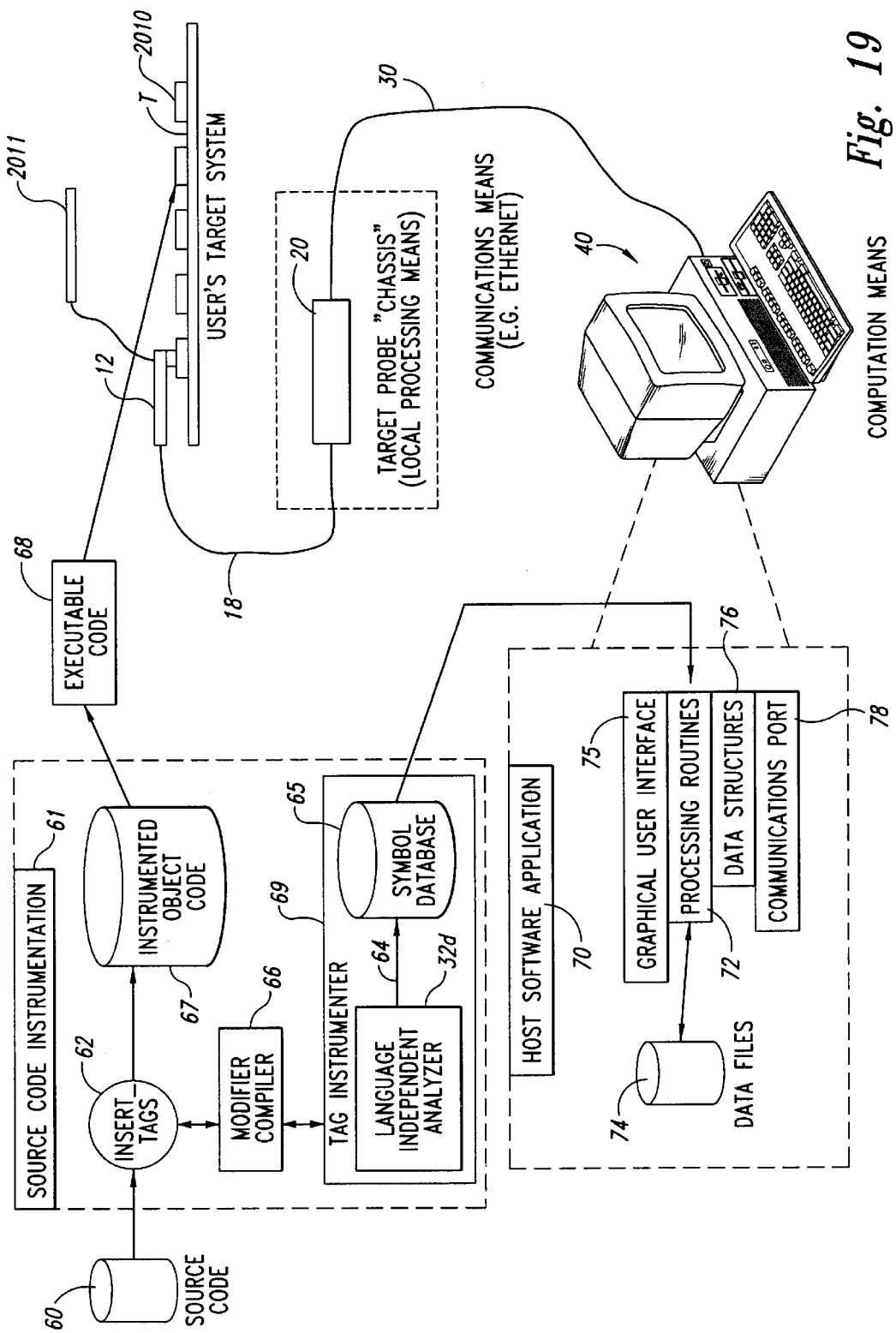
FIG. 19 is a schematic and block diagram of the software analysis system of FIG. 1 adapted for testing software running on an embedded system having a cache memory.

FIG. 19 illustrates an embodiment of the invention in which the tag instrumenter 69 has been set to instrument the source code 60 for operation in a target system T having a cache memory 2010. In this embodiment of the invention, the tag instrumenter 69 inserts tag statements into the source code 60 that perform a function call to an I/O port outside of the cache memory 2010, such as a function call across an Ethernet network 2011. Thus, when the target system T encounters a tagging statement in the executable code 68, the target system T will perform an external function call, such as a function call to the Ethernet network 2011. The function call may also be monitored by the probe 20. This embodiment enables the testing system to follow the program's execution even in the cache memory 2010. In all other respects, this embodiment of the invention performs in the manner discussed above with regard to other embodiments of the invention.

Further aspects of the invention are described in the following co-pending application, which is assigned to a common assignee: U.S. patent application Ser. No. 09/015,256, "Relocatable Instrumentation Tags for Testing and Debugging a Computer Program," filed on Jan. 29, 1998, now U.S. Pat. No. 6,106,571. The above U.S. Patent Application is hereby incorporated by reference.

It will be apparent to one skilled in the art that the various analysis functions that the software analysis system 10 is capable of displaying can be presented in displays other than shown in FIGS. 11–18, including printed reports, summaries, and annotated source code listings. Furthermore, from the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for instrumenting a computer program having source code with a plurality of tag statements, each tag statement specifying a unique value for a tagging variable, the system comprising:

a programming language-dependent parser that examines the source code and inserts the tag statements into the source code according to predetermined criteria to produce instrumented source code; and a programming language-independent instrumenter that determines unique values for the tagging variable associated with the tag statements inserted into the source code.

2. The system of claim 1 wherein the programming language-independent instrumenter selects a tagging statement based upon a set of characteristics common to more than one programming language and wherein a programming language of the source code includes the set of characteristics.

3. The system of claim 1, wherein the language-independent instrumenter comprises:

a language-independent analyzer that selects the unique values for the tagging variables and analyzes the source code; and a symbolic database that stores data related to the programming language-independent analyzer analysis of the source code.

4. The system of claim 1 wherein the programming language-dependent parser parses the instrumented source code for a compiler that produces instrumented object code.

5. The system of claim 1 wherein the programming language-dependent parser provides the instrumented source code to a compiler that parses the instrumented source code to produce instrumented object code.

6. The system of claim 1, further comprising:

a symbol database that stores tagging data sent from the programming language-independent instrumenter and that retrieves the tagging data for an instrumentation apparatus monitoring operation of the computer program.

7. The system of claim 6, further comprising:

an information retrieval application programming interface that resides between the symbol database and the instrumentation apparatus and receives requests for the tagging data from the instrumentation apparatus, locates the tagging data in the symbol database, and forwards the tagging data to the instrumentation apparatus without regard to the source code language.

8. The system of claim 1 wherein the language-independent instrumenter includes an information entry application programming interface that communicates with the language-dependent parser according to a communications format of the language-dependent parser and communicates with a language-independent analyzer according to a communications format of the language-independent analyzer.

9. The system of claim 1 wherein at least some of the inserted tag statements have a tag type field corresponding to an analysis function for which the tag is used, and wherein the language-independent instrumenter stores the tag type field in a symbol database for later retrieval by a processor that processes the tags differently according to their respective analysis functions based on respective values in the tag type field.

10. The system of claim 1 wherein the language-dependent parser inserts the tag statements in the source code at locations causing respective tag statements to be executed along with a plurality of function call and return statements, and wherein the system further comprises a call pair analyzer that determines which functions of the source code are linked to other functions of the source code based on an order in which the tags are captured during execution of the computer program.

11. The system of claim 10 wherein the call pair analyzer further includes means for compiling a record of a number of times that specific called functions are called by specific calling functions.

12. The system of claim 10 wherein the call pair analyzer further includes means for compiling a statistical record of a relatively frequency at which specific called functions are called by specific calling functions.

13. The system of claim 1 wherein the language-dependent parser inserts the tag statements into the source code at locations causing respective tag statements to be executed with a plurality of conditional decision points in the computer program, and wherein the system further comprises a decision point analyzer that determines when a decision point in the source code has been executed based on which the tags are captured during execution of the computer program.

14. The system of claim 1 wherein the language-dependent parser inserts the tag statements into the source code at locations causing respective tag statements to be executed with a plurality of memory allocation and deallocation statements in the computer program, and wherein the system further comprises a memory point analyzer that determines where memory space has been allocated or deallocated during execution of the computer program.

15. The system of claim 1 wherein the language-dependent parser inserts the tag statements in the source code at locations causing respective tag statements to be executed along with a plurality of data manipulation statements, and wherein the system further comprises a data manipulation analyzer that analyzes where and how data has been manipulated during execution of the computer program.

16. The system of claim 1 wherein the source code has at least one programming language and at least another programming language and the programming language-dependent parser examines the source code having the at least one programming language, the system further comprising:

another programming language-dependent parser that examines the source code having the at least another programming language and inserts tag statements according to the predetermined criteria to produce instrumented source code.

17. The system of claim 16 wherein the programming language-independent instrumenter determines unique values for the tagging variable associated with the tag statements inserted by the programming language-dependent parser and the another programming language-dependent parser and stores tagging data provided by the programming language-dependent parser and the another programming language-dependent parser in a symbol database.

18. The system of claim 1 wherein the computer program is executed in a target system having a data bus and an address bus, the instrumented source code having been used to produce instrumented executable code containing a plurality of executable tag statements which, when executed, cause the target system to write at least one tag to respective predetermined locations in an address space of the target system, the tags containing respective tag values corresponding to locations in the instrumented source code of the tag statements, the system further comprising:

a symbol database that stores tagging data provided by the programming language-independent analyzer;

a probe connected to the address and data busses of the target system while the target system is executing the instrumented executable code, the probe detecting when the predetermined location in the address space of the target system is being addressed, the probe capturing a tag on the data bus of the target system when the probe detects that the predetermined location has been addressed; and a processor connected to the probe, the processor determining the code locations that have been executed by referencing the tagging data stored in the symbol database and comparing the tagging data with the respective tag values of the captured tags.

19. A method for instrumenting a computer program having language-dependent source code with a plurality of tag statements, each tag statement specifying a unique value for a tagging variable, the method comprising:

parsing the language-dependent source code and inserting the tag statements according to predetermined criteria to produce language-dependent instrumented source code; and determining unique values for the tagging variable associated with the tag statements in a programming language-independent instrumenter.

20. The method of claim 19 wherein the parsing of the language-dependent source code is performed by a parser that also produces instrumented object code.

21. The method of claim 19 wherein the language-dependent instrumented source code is provided to a compiler that compiles the language-dependent instrumented source code to produce instrumented object code.

22. The method of claim 19, further comprising:

storing tagging data provided by the programming language-independent instrumenter in a symbol database; and retrieving the tagging data for an instrumentation apparatus that monitors operation of the computer program.

23. The method of claim 22 wherein an information retrieval application programming interface resides between the symbol database and the instrumentation apparatus, the method further comprising the steps of:

receiving requests by the information retrieval application programming interface for the tagging data from the instrumentation apparatus;

locating the tagging data in the symbol database by the information retrieval application programming interface; and forwarding the tagging data to the instrumentation apparatus by the information retrieval application programming interface.

24. The method of claim 19 wherein the language-independent instrumenter includes an information entry application programming interface that communicates with a parser that parses the language-dependent source code according to a communications format of the parser and communicates with a symbol database according to a communications format of the symbol database.

25. The method of claim 19 wherein at least some of the tag statements have a tag type field corresponding to an analysis function for which the tag is used, further comprising the steps of:

storing the tag type field in a symbol database by the language-independent instrumenter; and retrieving the tag type field from the symbol database by a processor that processes the tags different according to their respective analysis functions based on respective values in the tag type field.

26. The method of claim 19, further comprising the steps of:

inserting the tag statements in the language-dependent source code at locations causing respective tag statements to be executed along with a plurality of function call and return statements; and determining which functions of the language-dependent source code are linked to other functions of the language-dependent source code based on an order in which the tags are captured during execution of the computer program.

27. The method of claim 26, further comprising the step of:

compiling a record of a number of times that specific called functions are called by specific calling functions.

28. The method of claim 26, further comprising the step of:

compiling a statistical record of a relatively frequency at which specific called functions are called by specific calling functions.

29. The method of claim 19, further comprising the steps of:

inserting the tag statements in the language-dependent source code at locations causing respective tag statements to be executed along with a plurality of conditional decision points in the language-dependent source code; and determining which decision points in the language-dependent source code have been executed based on the tags captured during execution of the computer program.

30. The method of claim 19, further comprising the steps of:

inserting the tag statements in the language-dependent source code at locations causing respective tag statements to be executed with a plurality of memory allocation and deallocation statements in the computer program; and determining where memory space has been allocated or deallocated during execution of the computer program based on the tags captured during execution of the computer program.

31. The method of claim 19, further comprising the steps of:

inserting the tag statements in the language-dependent source code at locations in the language-dependent source code corresponding to data manipulation statements; and analyzing where and how data has been manipulated during execution of the computer program based on the tags captured during execution of the computer program.

32. The method of claim 19 wherein the source code has at least one programming language and at least another programming language, and wherein the parsing the source code, further comprising the steps of:

parsing the source code of the at least one programming language and inserting tag statements according to predetermined criteria to produce instrumented source code of the at least one programming language; and parsing the source code of the at least another programming language and inserting tag statements according to predetermined criteria to produce instrumented source code of the at least another programming language.

33. The method of claim 32 wherein the programming language instrumenter determines unique values for the tagging variable associated with the tag statements inserted into the source code of the at least one programming language and inserted into the source code of the at least another programming language and stores tagging data associated with both the source code of the at least one programming language and the source code of the at least another programming language in a symbol database.

34. The method of claim 19 wherein the computer program may be executed in a target system having a data bus and an address bus, the instrumented source code having been used to produce instrumented executable code containing a plurality of executable tag statements which, when executed, cause the target system to write at least one tag to respective predetermined locations in the address space of the target system, the tags containing respective tag values corresponding to locations in the instrumented source code of tag statements, the method further comprising the steps of:

allowing the target system to execute the executable code;

monitoring the address and data busses of the target system while the target system is executing the software;

detecting when the predetermined location in the address space of the target system is being addressed;

capturing a tag on the data bus when addressing of the predetermined location is detected; and determining the source code locations that have been executed based on the respective tag values of the captured tags.

* * * * *